(12) United States Patent
Taguchi et al.

(10) Patent No.: US 7,466,470 B2
(45) Date of Patent: Dec. 16, 2008

(54) AGGREGATE OF ELECTRONIC DEVICE CHIPS, ELECTRONIC DEVICE CHIP, AGGREGATE OF DIFFRACTION GRATING LIGHT MODULATORS, AND DIFFRACTION GRATING LIGHT MODULATOR

(75) Inventors: Ayumu Taguchi, Kanagawa (JP); Masato Nishida, Kanagawa (JP); Yasuyuki Ito, Kanagawa (JP); Hitoshi Tamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 11/208,190

(22) Filed: Aug. 18, 2005

(65) Prior Publication Data
US 2006/0056001 A1    Mar. 16, 2006

(30) Foreign Application Priority Data
Sep. 2, 2004    (JP)    ............................ P2004-255083

(51) Int. Cl.
G02F 1/03    (2006.01)
G02B 26/00    (2006.01)
H01R 11/30    (2006.01)
(52) U.S. Cl. .......................... 359/254; 359/290; 439/39

(58) Field of Classification Search .................. 359/245; 439/39, 55, 78, 83
See application file for complete search history.

(56) References Cited

U.S. PATENT DOCUMENTS 6,121,859 A * 9/2000 Takahashi .................... 333/193
2004/0245599 A1* 12/2004 Kato .......................... 257/529

* cited by examiner

*Primary Examiner*—Scott J Sugarman
*Assistant Examiner*—Dawayne A Pinkney
(74) *Attorney, Agent, or Firm*—Sonnenschein Nath & Rosenthal LLP

(57) ABSTRACT

A diffraction grating light modulator composed of a plurality of diffraction grating light modulating elements formed on a substrate, each consisting of a lower electrode, belt-like fixed electrodes and movable electrodes supported above the lower electrode, and exposed connecting terminals (for electrical connection to external circuits) electrically connected to the movable electrodes, the fixed electrodes and the movable electrodes constituting a diffraction grating upon application of a voltage to the lower electrode, the diffraction grating light modulator having a protective electrode surrounding the connecting terminals, so that the diffraction grating light modulating element is certainly protected from damage by static electricity.

8 Claims, 13 Drawing Sheets

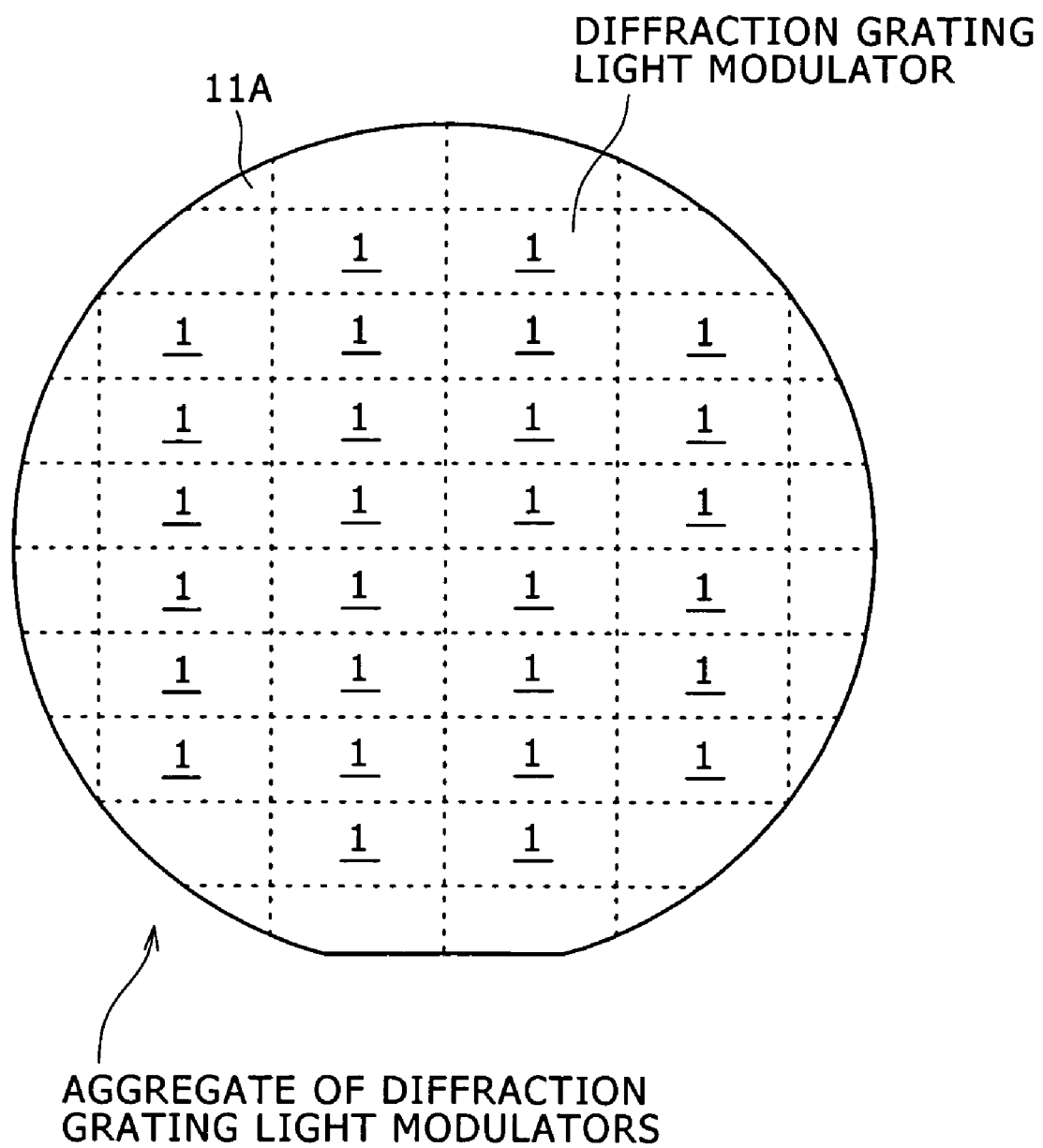

→ X DIRECTION

→ Y DIRECTION

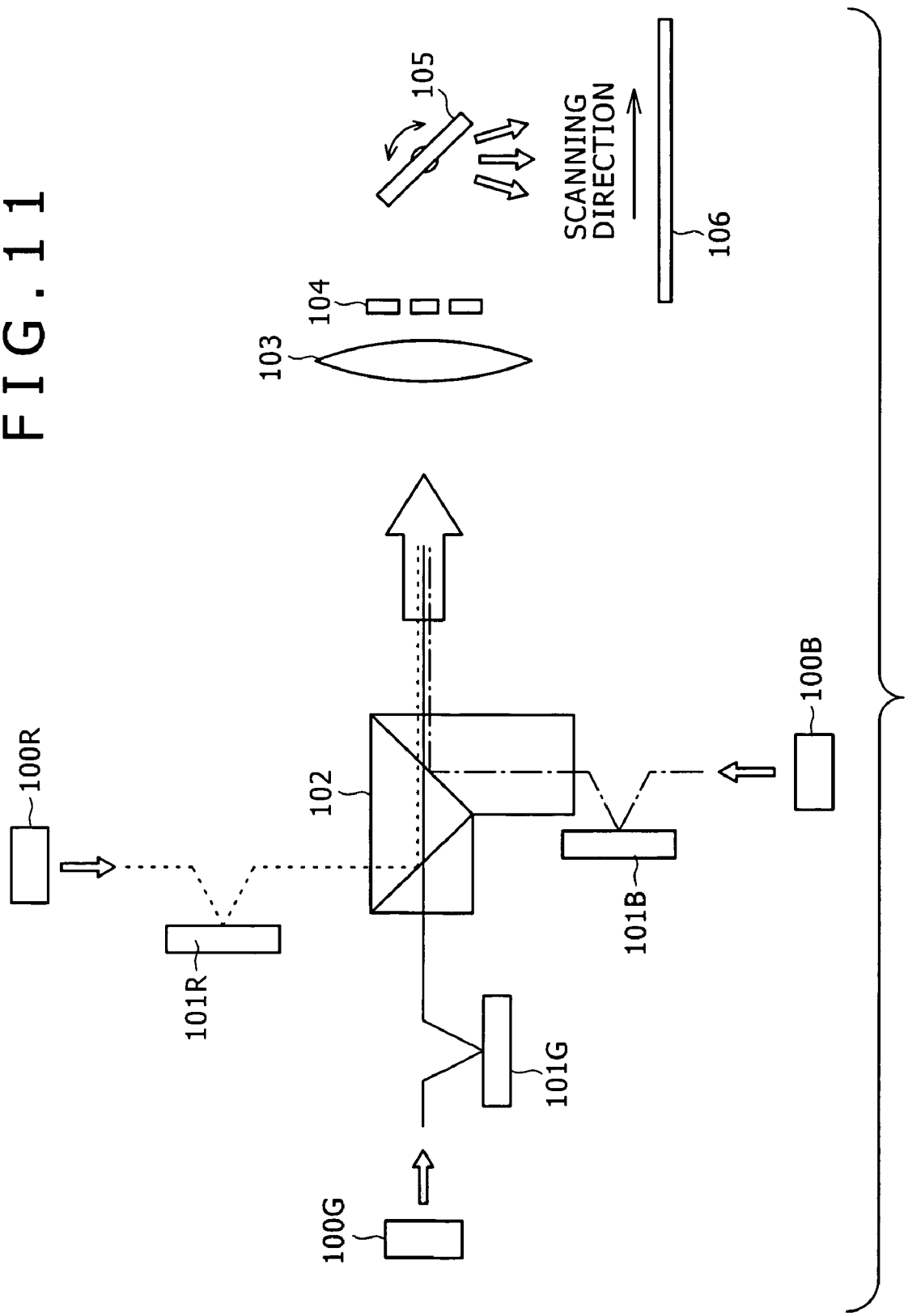

[ STEP-100 ]

[ STEP-100 ] (SEQUEL)

[ STEP-110 ]

[ STEP-120 ]

[STEP-130]

[STEP-140]

[STEP-150]

[STEP-160]

AGGREGATE OF ELECTRONIC DEVICE CHIPS, ELECTRONIC DEVICE CHIP, AGGREGATE OF DIFFRACTION GRATING LIGHT MODULATORS, AND DIFFRACTION GRATING LIGHT MODULATOR

RELATED APPLICATION DATA

The present application claims priority to Japanese Application(s) No(s). P2004-255083 filed Sep. 2, 2004, which application(s) is/are incorporated herein by reference to the extent permitted by law.

BACKGROUND OF THE INVENTION

The present invention relates to an aggregate of electronic device chips, an electronic device chip, an aggregate of diffraction grating light modulators, and a diffraction grating light modulator.

An image-forming device, such as projector and printer, which is so designed as to form a two-dimensional image from a one-dimensional image displaying device by projecting a light beam onto an image forming means while scanning with a light scanning means, is known from Japanese patent Nos. 3401250 and 3164824. The one-dimensional image displaying device is composed of a plurality of diffraction grating light modulators (GLV: Grating Light Valve) which are arranged in an array pattern. Incidentally, this one-dimensional image displaying device is referred to as diffraction grating light modulator. The diffraction grating light modulator is produced by using the micromachine producing technology. It is included of reflective diffraction grating and it performs optical switching action. It forms an image as light is turned on and off electrically. In other words, the diffraction grating light modulator produces a two-dimensional image by scanning (with a scan mirror) the light beam emerging from the individual diffraction grating light modulating elements. Therefore, if a two-dimensional image composed of M×N pixels (for example, 1920×1080 pixels) is to be formed, it is necessary to construct the diffraction grating light modulator from N units (or 1080 units) of diffraction grating light modulating elements. Moreover, for color display, it is necessary to use three units of diffraction grating light modulators.

FIG. 6 is a schematic diagram illustrating diffraction grating light modulating elements 10 each having a lower electrode 12, fixed electrodes 21, and movable electrodes 22. Incidentally, hatching in FIG. 6 distinguishes the lower electrode 12, the fixed electrodes, 21, the movable electrode 22s, and the supports 14, 15, 17, and 18.

The diffraction grating light modulator 10 consists of the lower electrode 12, and elongate (ribbon-like) fixed electrodes 21, and the elongate (ribbon-like) movable electrodes 22. The lower electrode 12 is formed on the support 11. The fixed electrodes 21 are held by the supports 14 and 15, so that they are suspended and stretched above the lower electrode 12. Moreover, the movable electrodes 22 are held by the supports 17 and 18, so that they are suspended and stretched above the lower electrode 12 and are juxtaposed to the fixed electrodes 21. In the example shown, one diffraction grating light modulating unit 10 is composed of three fixed electrodes 21 and three movable electrodes 22. The three movable electrodes 22 are collectively connected to the control electrode, which is connected to a connecting terminal (not shown). On the other hand, the three fixed electrodes 21 are collectively connected to the bias electrode, which is common to a plurality of diffraction grating light modulating units 10 and which is grounded through a bias electrode terminal (not shown). The lower electrode 12 is also common to a plurality of diffraction grating light modulating units 10 and which is grounded through a lower electrode terminal (not shown).

When a voltage is applied to the movable electrodes 22 through the connecting terminal and control electrode and also a voltage is applied to the lower electrode 12 (which is actually grounded), an electrostatic force (Coulomb force) occurs between the movable electrodes 22 and the lower electrode 12. This electrostatic force moves the movable electrodes 22 downward or toward the lower electrode 12. The configuration of the movable electrodes 22 before displacement is shown in FIG. 7A and FIG. 10B (left side), and that after displacement is shown in FIG. 10A and FIG. 10B (right side). As the result of displacement of the movable electrodes 22, a diffraction grating of reflective type is formed by the movable electrodes 22 and the fixed electrodes 12.

The following relation is established among the distance (d) between adjacent fixed electrodes 21 (see FIG. 10B), the incident angle ($\theta_i$) and the wavelength ($\lambda$) of the incoming light incident on the movable electrodes 22 and the fixed electrodes 21, and the angle of diffraction ($\theta_m$)

$$d[\sin(\theta_i) - \sin(\theta_m)] = m \cdot \lambda$$

where m denotes an order, which assumes any number of 0, ±1, ±2, . . . .

The diffracted light has the maximum intensity when the difference ($\Delta h_1$) between the top of the movable electrodes 22 and the top of the fixed electrodes 21 is equal to $\lambda/4$. (See FIG. 10B.)

FIG. 11 schematically shows an image forming device equipped with three units of the diffraction grating light modulators mentioned above. The image forming device has three light sources 100R, 100G, and 100B, which emit respectively a red laser beam (indicated by a dotted line), a green laser beam (indicated by a solid line), and a blue laser beam (indicated by a chain line), as primaries. The laser beams emerging from these light sources pass through condenser lenses (not shown) and enter respectively the diffraction grating light modulators 101R, 101G, and 101B. They are combined into one beam by the L-shape prism 102. The combined beam passes through the lens 103, the spatial filter 104, and the image forming lens (not shown). The beam is finally scanned by the scan mirror 105 and projected to the screen 106.

The image forming device mentioned above works as follows. When the diffraction grating light modulating element 10 is not in operation (or the movable electrodes 22 are in the state as shown in FIG. 7A and FIG. 10B (left side)), the light reflected by the top of the movable electrodes 22 and the fixed electrodes 21 is screened by the spatial filter 104. On the other hand, when the diffraction grating light modulating element 10 is in operation (or the movable electrodes 22 are in the state as shown in FIG. 10A and FIG. 10B (right side)), the light (with m=±1) reflected by the top of the movable electrodes 22 and the fixed electrodes 21 passes through the spatial filter 104. This construction permits the on-off control of the light to be projected to the screen 106. In addition, if the voltage to be applied to the movable electrodes 22 is properly varied, it is possible to change the difference ($\Delta h_1$) between the movable electrodes 22 and the fixed electrodes 21 in the height of their tops.

With very small movable electrodes 22, the diffraction grating light modulator is capable of displaying with high resolution, rapid switching, and broad band. In addition, the movable electrodes 22 are operable with a low voltage and hence the diffraction grating light modulator will help realize a very small image forming device. Such an image forming device (which performs scanning with the scan mirror 105) produces a much smoother and more natural image than the ordinary two-dimensional image forming device of projection type that employs a liquid crystal panel. Moreover, the laser beam primaries reproduce natural colors which have never been attained.

SUMMARY OF THE INVENTION

Unfortunately, the diffraction grating light modulating element has the disadvantage of being vulnerable to static electricity.

For example, it may be broken when a potential difference of only about 22 volt (due to static electricity) is applied across the movable electrodes 22 and the lower electrode 12. In other words, a potential difference applied across the movable electrodes 22 and the lower electrode 12 brings about snap-down or snap-over. Snap-down is a phenomenon that the movable electrodes 22 come into contact with the lower electrode 12 and do not return to the state shown in FIG. 7A. Once snap-down takes place, charge moves from the lower electrode 12 to the movable electrodes 22, thereby preventing the reproducible action of the diffraction grating light modulating element. Snap-over is a phenomenon that the alternately arranged movable electrodes 22 and fixed electrodes 21 attract to each other due to static electricity or discharge (due to static electricity). In the worst case, the movable electrodes 22 and the fixed electrodes 21 are fused together or broken.

While the diffraction grating light modulator is in the course of fabrication, the movable electrodes 22 are in a "floating" state. Moreover, the diffraction grating light modulator has such a high impedance and such a low capacity that it easily experiences snap-down or snap-over even when a very small amount of charge enters the movable electrodes 22. However, the diffraction grating light modulator is not subject to snap-down or snap-over while it is connected to the peripheral circuits, such as driving circuits, so that it is protected by the protective circuits built into the peripheral circuits. In this state, the movable electrodes 22 are in a "non-floating" state.

Production of the diffraction grating light modulator consists of several steps of forming an aggregate of diffraction grating light modulators on a silicon semiconductor substrate and separating (by dicing) the aggregate into individual diffraction grating light modulators. During such fabrication steps, static electricity that occurs due to friction of the substrate enters the movable electrodes 22, thereby destroying the diffraction grating light modulators.

Up to now, there is no effective or adequate means to prevent the diffraction grating light modulator from being destroyed by static electricity.

It is an object of the present invention to provide a diffraction grating light modulator or an aggregate of diffraction grating light modulators which has a means to certainly prevent the diffraction grating light modulator from being destroyed by static electricity, or in a broader sense an electronic device chip or an aggregate of electronic device chips which has a means to certainly prevent disruption by static electricity.

The above-mentioned object of the present invention is achieved by an aggregate of electronic device chips which includes a plurality of electronic device chips formed on a substrate surface, each electronic device chip having exposed connecting terminals for electrical connection to external circuits and also having a protective electrode surrounding the connecting terminals.

According to the present invention, the aggregate of electronic device chips that achieves the above-mentioned object is formed on the surface of a support such that it has exposed connecting terminals for electrical connection to external circuits and also has protective electrode surrounding the connecting terminals.

According to the present invention, the electronic device chip or the aggregate of electronic device chips has the protective electrode so that it prevent static electricity, which has occurred on the front face and/or rear face of the substrate (for the aggregate of electronic device chips) or the support (for the electronic device chip), from entering the electronic device chip through the connecting terminals.

According to the present invention, the electronic device chip or the aggregate of electronic device chips may be constructed such that the protective electrode is in a floating state (in which it not grounded or not connected to a power source or an electrical terminal that affects the action of the electronic device chip).

The first embodiment of the present invention to achieve the above-mentioned object covers an aggregate of diffraction grating light modulators which includes a plurality of diffraction grating light modulators each having a plurality of diffraction grating light modulating elements formed on a substrate, each consisting of (A) a lower electrode,
(B) belt-like fixed electrodes supported above the lower electrode,
(C) belt-like movable electrodes supported above the lower electrode and juxtaposed to the fixed electrodes, and
(D) exposed connecting terminals (for electrical connection to external circuits) electrically connected to the movable electrodes, the fixed electrodes and the movable electrodes constituting a diffraction grating as the latter is displaced toward the lower electrode by electrostatic force acting between the movable electrodes and the lower electrode, the electrostatic force being generated by application of a voltage to the movable electrodes and the lower electrode from an external circuit through the connecting terminals, each of the diffraction grating light modulators having a protective electrode surrounding the connecting terminals.

The first embodiment of the present invention to achieve the above-mentioned object also covers a diffraction grating light modulator which includes a plurality of diffraction grating light modulating elements formed on a substrate, each consisting of (A) a lower electrode,
(B) belt-like fixed electrodes supported above the lower electrode,
(C) belt-like movable electrodes supported above the lower electrode and juxtaposed to the fixed electrodes, and
(D) exposed connecting terminals (for electrical connection to external circuits) electrically connected to the movable electrodes, the fixed electrodes and the movable electrodes constituting a diffraction grating as the latter is displaced toward the lower electrode by electrostatic force acting between the movable electrodes and the lower electrode, the electrostatic force being generated by application of a voltage to the movable electrodes and the lower electrode from an external circuit through the connecting terminals, the diffraction grating light modulator having a protective electrode surrounding the connecting terminals.

The second embodiment of the present invention to achieve the above-mentioned object covers an aggregate of diffraction grating light modulators which includes a plurality of diffraction grating light modulators each having a plurality of diffraction grating light modulating elements formed on a substrate, each consisting of (A) a lower electrode,
(B) belt-like fixed electrodes supported above the lower electrode,
(C) belt-like movable electrodes supported above the lower electrode and juxtaposed to the fixed electrodes, and
(D) exposed connecting terminals (for electrical connection to external circuits) electrically connected to the movable electrodes, the fixed electrodes and the movable electrodes constituting a diffraction grating as the latter is displaced toward the lower electrode by electrostatic force acting between the movable electrodes and the lower electrode, the electrostatic force being generated by application of a voltage to the movable electrodes and the lower electrode from an external circuit through the connecting terminals, each of the diffraction grating light modulators having a protective electrode on its peripheral part.

The second embodiment of the present invention to achieve the above-mentioned object also covers a diffraction grating light modulator which includes a plurality of diffraction grating light modulating elements formed on a substrate, each consisting of (A) a lower electrode,
(B) belt-like fixed electrodes supported above the lower electrode,
(C) belt-like movable electrodes supported above the lower electrode and juxtaposed to the fixed electrodes, and
(D) exposed connecting terminals (for electrical connection to external circuits) electrically connected to the movable electrodes, the fixed electrodes and the movable electrodes constituting a diffraction grating as the latter is displaced toward the lower electrode by electrostatic force acting between the movable electrodes and the lower electrode, the electrostatic force being generated by application of a voltage to the movable electrodes and the lower electrode from an external circuit through the connecting terminals, the diffraction grating light modulator having protective electrode on its peripheral part.

The movable electrodes and fixed electrodes in the diffraction grating light modulator (or an aggregate thereof) pertaining to the first and second embodiments of the present invention may be prepared by using the micromachine technology. The movable electrodes and fixed electrodes constitute a so-called reflective diffraction grating.

According to the present invention, the protective electrode in the diffraction grating light modulator (or an aggregate thereof) is intended to protect the movable electrodes from the static electricity entering it which occurs on the front face and/or rear face of the substrate (for the aggregate of diffraction grating light modulators) or the support (for the diffraction grating light modulator).

According to the present invention, the diffraction grating light modulator (or the aggregate thereof) may be constructed such that the protective electrode is in a floating state (which means that it is not grounded or connected to an electrical terminal or power source which affects the action of the diffraction grating light modulator). It may also be constructed such that the protective electrode is connected to a conducting part having a larger area than the connecting terminal. To be concrete, the protective electrode may be connected to the lower electrode. Alternatively, the fixed electrodes constituting the diffraction grating light modulator may be connected to the bias electrode common in each diffraction grating light modulating element and the protective electrode may be connected to the bias electrode. Incidentally, the conducting part having a larger area than the connecting terminal (e.g., lower electrode and bias electrode) denotes any conducting part having a static capacity between the connecting terminal and the movable electrode (or any conducting part which forms a certain kind of capacitor between the connecting terminal and the movable electrodes).

The aggregate of electronic device chips according to the present invention denotes an aggregate consisting of a plurality of electronic device chips arranged in a two-dimensional matrix. It is cut and separated into individual electronic device chips. The electronic device chip includes not only the diffraction grating light modulator but also IC, MEMS (Micro Electro Mechanical System), and digital micromirror device (DMD). The aggregate of diffraction grating light modulators according to the present invention denotes an aggregate of a plurality of diffraction grating light modulators arranged in a two-dimensional matrix. It is cut and separated into individual diffraction grating light modulators. Incidentally, an aggregate of a plurality of diffraction grating light modulating elements constituting one diffraction grating light modulator may be referred to as the diffraction grating light modulator proper.

A silicon semiconductor substrate may be used as the substrate (for the aggregate of electronic device chips or the aggregate of diffraction grating light modulators according to the first and second embodiments) and the support (for the electronic device chip and the diffraction grating light modulator according to the first and second embodiments).

The substrate and the support are defined as follows. The substrate is an object on which are formed a large number of electronic device chips or a large number of diffraction grating light modulators. The support is an object on which is formed a single electronic device chip or a single diffraction grating light modulator. In other words, the substrate changes into the support after cutting into individual pieces.

In the aggregate of diffraction grating light modulators according to the present invention, the lower electrode and bias electrode may be formed from at least one species of metals (or alloys or compounds thereof) selected from the group consisting of aluminum (Al), titanium (Ti), gold (Au), silver (Ag), tungsten (W), niobium (Nb), tantalum (Ta), molybdenum (Mo), chromium (Cr), copper (Cu) nickel (Ni), cobalt (Co), zirconium (Zr), iron (Fe), platinum (Pt), and zinc (Zn). The metal compounds include nitrides such as TiN, and silicides such as $WSi_2$, $MoSi_2$, $TiSi_2$, and $TaSi_2$. They may also be formed from a semiconductor, such as silicon (Si), and conductive metal oxides, such as ITO (indium tin oxide), indium oxide, and zinc oxide. The lower electrode and the bias electrode may be formed by any known thin film forming technology including CVD method, sputtering method, vapor deposition method, lift off method, ion plating method, electrolytic plating method, electroless plating method, screen plating method, laser abrasion method, and sol-gel method. The thin film of the above-mentioned material is formed on the surface of the substrate (or support).

In the diffraction grating light modulator (or the aggregate thereof) according to the present invention, the fixed electrodes and the movable electrodes should preferably be composed of a light reflective layer (upper layer) and a dielectric layer (lower layer). To be concrete, they should be of laminate structure composed of an aluminum layer (upper layer) and an SiN layer (lower layer), an aluminum layer (upper layer) and an $SiO_2$ layer (lower layer), an Si-containing aluminum layer (upper layer) and an SiN layer (lower layer), an Si-containing aluminum layer (upper layer) and an $SiO_2$ layer (lower layer), a Cu-containing aluminum layer (upper layer) and an SiN layer (lower layer), a Cu-containing aluminum layer (upper layer) and an SiO$_2$ layer (lower layer), a titanium oxide layer (upper layer) and an SiN layer (lower layer), or a titanium oxide layer (upper layer) and an SiO$_2$ layer (lower layer). The lower layer may be of double-layer structure composed of an SiO$_2$ layer and an SiN layer. (The content of Cu in the Cu-containing aluminum layer may be 0.1 to 5 wt %.)

Moreover, in the diffraction grating light modulator (or the aggregate thereof) according to the present invention, the supporting part to support the fixed electrodes should preferably be formed from the extended part of the fixed electrode, and the supporting part to support the movable electrodes should preferably be formed from the extended part of the movable electrode.

In the diffraction grating light modulator (or the aggregate thereof) according to the present invention, the difference ($\Delta h_0$) between the height of the top of the lower electrode and the height of the top of the fixed electrodes should be $3.0 \times 10^{-7}$ to $1.5 \times 10^{-6}$ m, preferably $4.5 \times 10^{-7}$ to $1.2 \times 10^{-6}$ m. In addition, it is desirable that the difference between the height of the top of the fixed electrodes and the height of the top of the movable electrodes should be as close to zero as possible when the diffraction grating light modulating element is not in operation. Moreover, it is desirable that the maximum value ($\Delta h_{1-MAX}$) of the difference ($\Delta h_1$ which is the amount of downward displacement of the movable electrodes) between the height of the top of the movable electrodes and the height of the top of the fixed electrodes should satisfy the following expression when the diffraction grating light modulating element is in operation.

$$\lambda/4 = \Delta h_{1-MAX}$$

where, $\lambda$ is the wavelength of light incident to the diffraction grating light modulating element or the diffraction grating light modulator.

In addition, it is desirable that the relation between $\Delta h_{1-MAX}$ and $\Delta h_1$ should meet the following expression.

$$\Delta h_{1-MAX} \leq \Delta h_1/3$$

Incidentally, it is possible to change the difference $\Delta h_1$ (which is the amount of downward displacement of the movable electrodes) between the height of the top of the movable electrodes and the height of the top of the fixed electrodes by varying the voltage applied to the movable electrode. Thus, it is possible to change the intensity of diffraction, thereby controlling the gray level.

According to the present invention, no restrictions are imposed on the distance (d) between adjacent fixed electrodes in the diffraction grating light modulator (or the aggregate thereof). It should be usually $1 \times 10^{-6}$ to $2 \times 10^{-5}$ m, preferably $2 \times 10^{-6}$ to $1 \times 10^{-5}$ m. Also, no restrictions are imposed on the gap SP between adjacent fixed electrode and movable electrode (in one diffraction grating light modulating element or between adjacent diffraction grating light modulating elements). It should be usually $1 \times 10^{-7}$ to $2 \times 10^{-6}$ m, preferably $2 \times 10^{-7}$ to $5 \times 10^{-7}$ m. The width $W_F$ of the fixed electrode is not specifically restricted; it should be usually $1 \times 10^{-6}$ to $1 \times 10^{-5}$ m, preferably $2 \times 10^{-6}$ to $5 \times 10^{-6}$ m. The effective length $L_F$ of the fixed electrode is not specifically restricted; it should be usually $2 \times 10^{-5}$ to $5 \times 10^{-4}$ m, preferably $1 \times 10^{-4}$ to $3 \times 10^{-4}$ m. The width $W_M$ of the movable electrode is not specifically restricted; it should be usually $1 \times 10^{-6}$ to $1 \times 10^{-5}$ m, preferably $2 \times 10^{-6}$ to $5 \times 10^{-6}$ m. Moreover, the width of the movable electrode should preferably be equal to the width $W_F$ of the fixed electrode. The effective length $L_M$ of the movable electrode is not specifically restricted; it should be usually $2 \times 10^{-5}$ to $5 \times 10^{-4}$ m, preferably $1 \times 10^{-4}$ to $3 \times 10^{-4}$ m. Incidentally, the effective length $L_F$ of the fixed electrode and the effective length $L_M$ of the movable electrode are defined respectively as the length of that part of the fixed electrode and the movable electrode which extends from one supporting part to another (assuming that the fixed electrodes and movable electrodes are held by the supporting parts).

According to the present invention, in the diffraction grating light modulator (or the aggregate thereof), the respective numbers of the fixed electrodes and movable electrodes constituting one diffraction grating light modulating element is not specifically restricted. At least one pair of fixed electrode and movable electrode is necessary and the maximum of three pairs is enough. In the diffraction grating light modulator, a plurality of diffraction grating light modulating elements may be arranged in one-dimensional array. In other words, a plurality of fixed electrodes and movable electrodes constituting one diffraction grating light modulating element may be juxtaposed to each other in the direction perpendicular to the axial direction of the fixed electrodes and movable electrodes. The number of diffraction grating light modulating elements should be determined according to the number of pixels required of a specific image display equipment.

The above-mentioned material to constitute the lower electrode and bias electrode may also be used to constitute the connecting terminal and protective electrode in the aggregate of electronic device chips, the electronic device chip, the aggregate of diffraction grating light modulators according to the first or second embodiment, and the diffraction grating light modulator according to the first or second embodiment. It may also be used to constitute the control electrode to electrically connect the connecting terminal and movable electrodes in the aggregate of diffraction grating light modulators. The above-mentioned method for forming the lower electrode and bias electrode may also be applied to forming the connecting terminal, protective electrode, and control electrode. Incidentally, it is possible to form the lower electrode, bias electrode, connecting terminal, protective electrode, and control electrode at the same time. These four kinds of electrodes and the connecting terminals may be formed in any combination. The film thickness is not specifically restricted.

According to the present invention, the connecting terminal may have any plane shape, including square, rectangle, polygon, circle, and ellipse. A plurality of connecting terminals may be arranged straight or zigzag.

In the aggregate of electronic device chips, the electronic device chip, the aggregate of diffraction grating light modulators according to the first embodiment, and the diffraction grating light modulator according to the first embodiment, the protective electrode may take on a plane shape such that the protective electrode surrounds the connecting terminals, with a certain space left between them. In this case, there may exist three configurations as follows.

(1) One protective electrode is provided for one connecting terminal, and these protective electrodes are electrically connected to each other.

(2) One protective electrode is provided for more than one connecting terminal, and these protective electrodes are electrically connected to each other.

(3) One protective electrode is provided for all the connecting terminals.

Incidentally, in the case of configuration in which the protective electrode surrounds the connecting terminals, with a certain space left between them, the protective electrode may surround the connecting terminals over the almost entire periphery of the connecting terminals excluding the part at which the connecting terminals are connected to the control electrode. Alternatively, the protective electrode surrounds the connecting terminals over a part of the connecting terminals.

Also, in the aggregate of diffraction grating light modulators according to the second embodiment or the diffraction grating light modulator according to the second embodiment, the protective electrode may take on a plane shape such that the protective electrode surrounds the diffraction grating light modulator proper, with a certain space left between them. In this case, the protective electrode may surround the diffraction grating light modulator proper over almost its entire periphery or a part (say, one half) of its periphery. In addition, the protective electrode may surround singly or multiply (say, dually) the diffraction grating light modulator proper, with a certain space left between them (provided that they are electrically connected).

In the diffraction grating light modulators (or the aggregate thereof) according to the present invention, the protective electrode may be connected to the lower electrode directly or indirectly through a resistor.

In the diffraction grating light modulators (or the aggregate thereof) according to the present invention, the top surface of the movable electrode and fixed electrode may be parallel to the top surface of the lower electrode or may be inclined with a blaze angle of $\theta_D$. In the latter case, the diffraction grating functions as a blazed grating which reflects only diffracted light with the order of +1.

The diffraction grating light modulator according to the present invention has the protective electrode which surrounds the connecting terminals or the protective electrode is provided around the support or each diffraction grating light modulator. This structure certainly prevents static electricity from entering from the connecting terminals. Thus, according to the present invention, it is possible to protect the electronic device chip or the diffraction grating light modulator (or diffraction grating light modulating element) from damage. As the result, this leads to the stable production with high yields of the electronic device chip and the diffraction grating light modulator.

BRIEF DESCRIPTION OF THE DRAWINGS

FIG. 5 is a schematic diagram showing the aggregate of diffraction grating light modulator in Example 1.

FIG. 11 is a schematic diagram showing the image forming equipment composed of three sets of diffraction grating light modulators.

DETAILED DESCRIPTION OF THE PREFERRED EMBODIMENTS

The examples of the invention will be described below with reference to the accompanying drawings.

EXAMPLE 1

This example is concerned with the aggregate of electronic device chips pertaining to the present invention, the electronic device chip pertaining to the present invention, the aggregate of diffraction grating light modulators pertaining to the first embodiment of the present invention, and the diffraction grating light modulator pertaining to the first embodiment of the present invention.

Incidentally, in Examples 1 to 4, the aggregate of electronic device chips corresponds to the aggregate of diffraction grating light modulators, and the electronic device chip corresponds to the diffraction grating light modulator. Consequently, the following description is limited to the aggregate of diffraction grating light modulators and the diffraction grating light modulator.

Figure 1A:
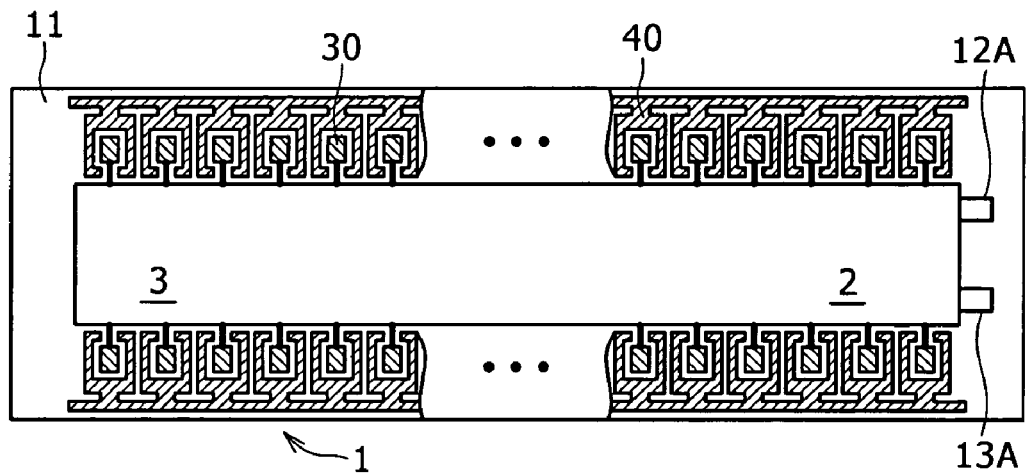
FIGS. 1A to 1C are schematic diagrams showing the diffraction grating light modulator and modified versions thereof in Example 1.

FIG. 1A is a schematic diagram showing the diffraction grating light modulator 1 in Example 1. Incidentally, in FIGS. 1A to 1C, FIGS. 2A to 2C, FIGS. 3A to 3C, and FIGS. 4A to 4C, hatching indicates the connecting terminal 30 and the protective electrode 40.

Figure 6:
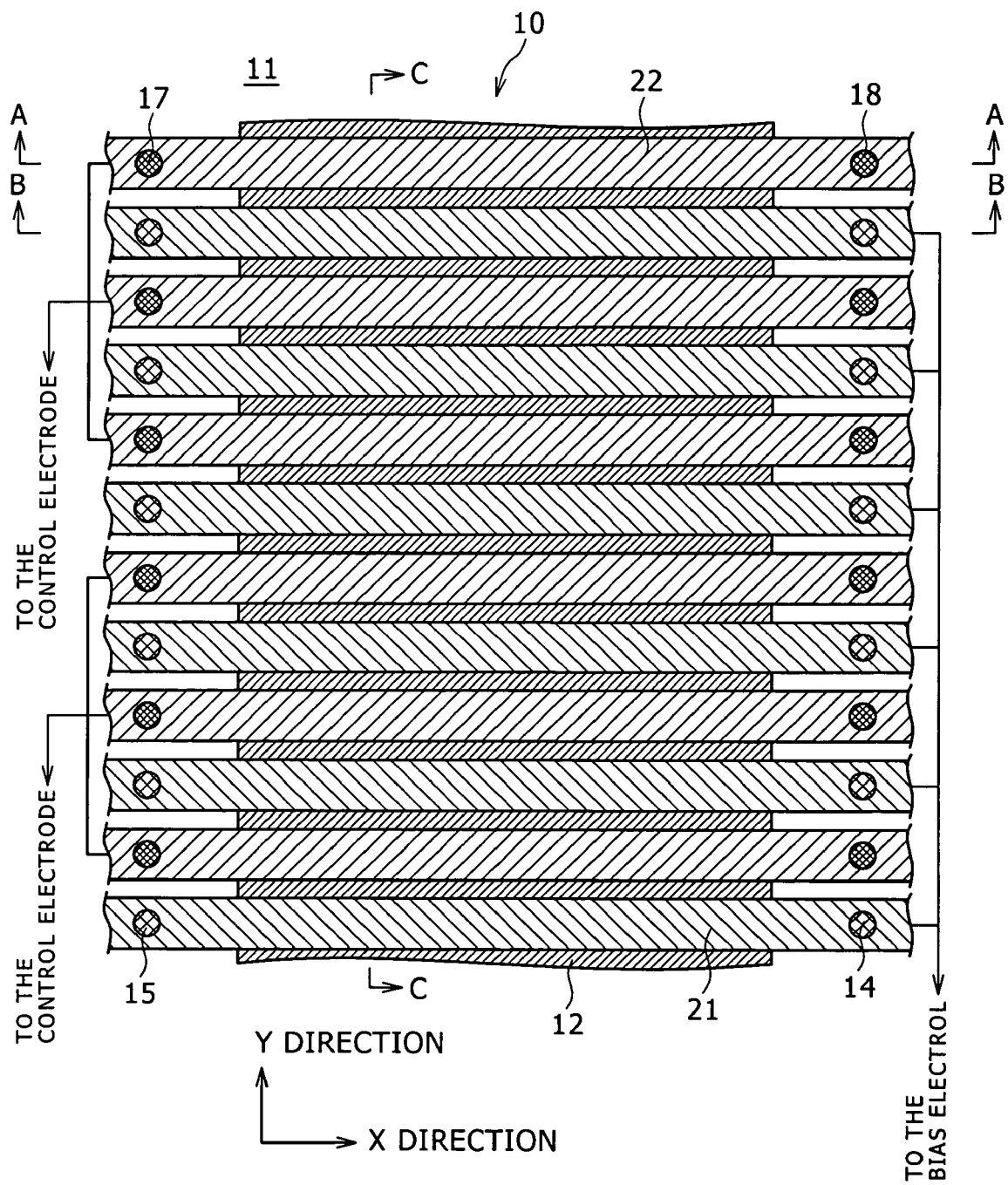
FIG. 6 is a schematic diagram showing the arrangement of the lower electrode, fixed electrodes, and movable electrodes constituting the diffraction grating light modulator.
Figure 7A:
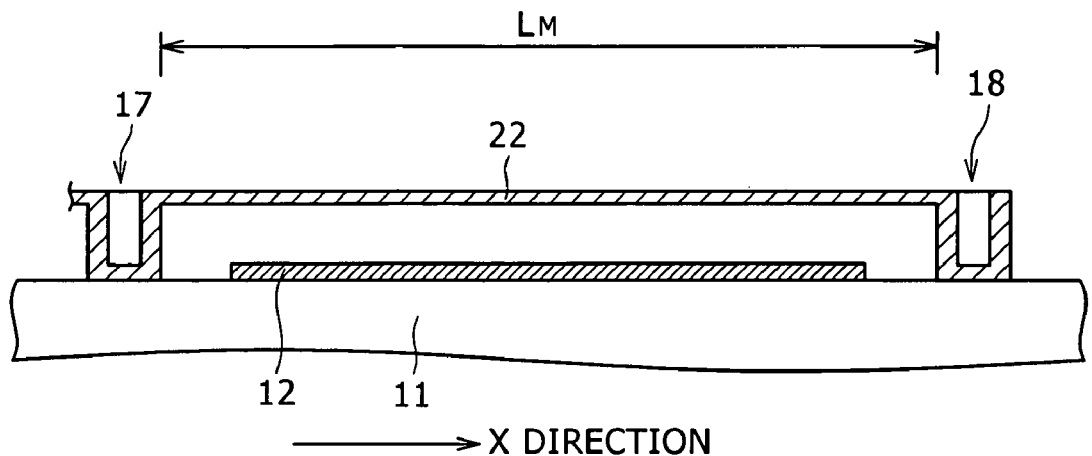
FIGS. 7A to 7C are schematic sectional views of the movable electrodes taken along the line A-A in the direction of the arrows in FIG. 6. (The diffraction grating light modulator is not in operation.)
Figure 7B:
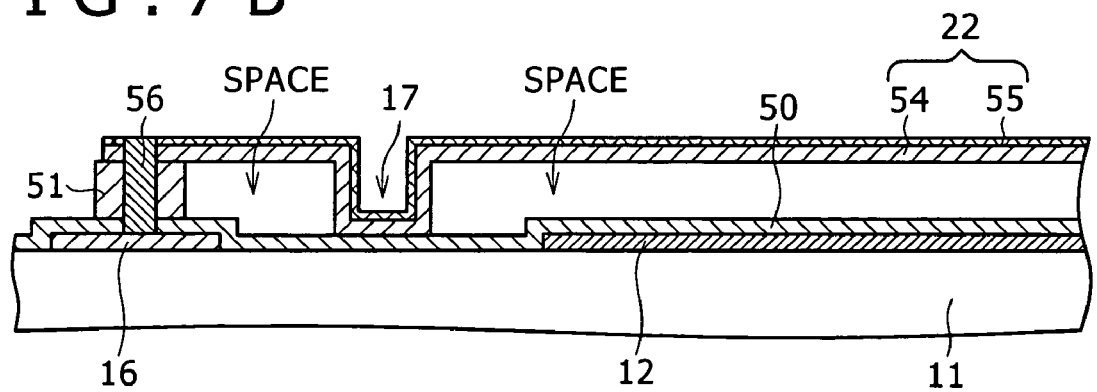
Figure 7C:
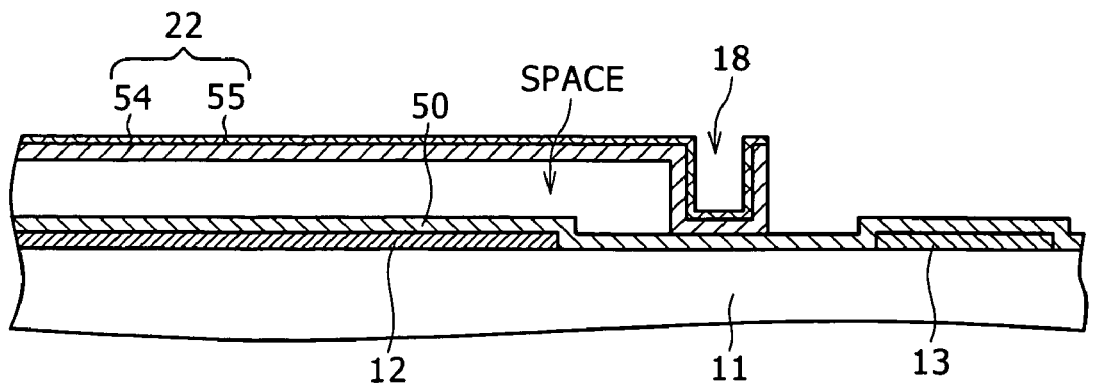
Figure 8A:
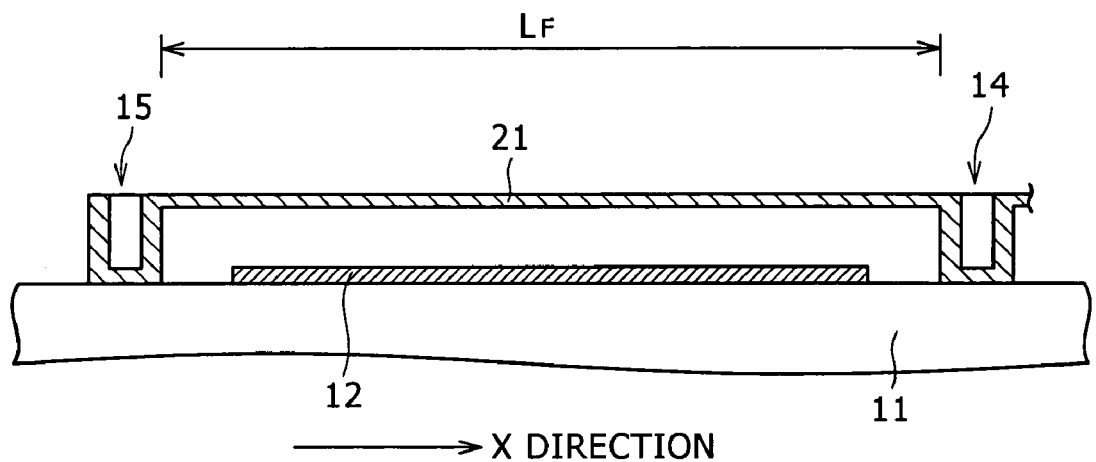
FIGS. 8A to 8C are schematic sectional views of the fixed electrodes taken along the line B-B in the direction of the arrows in FIG. 6.
Figure 8B:
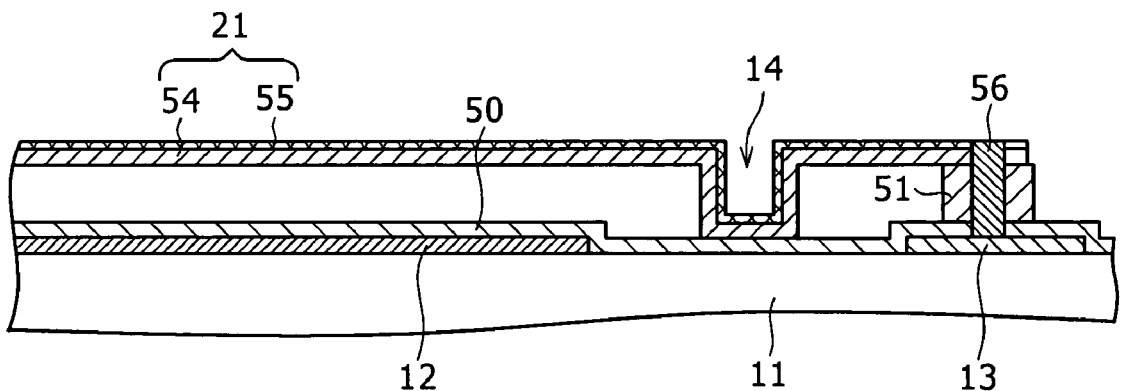
Figure 8C:
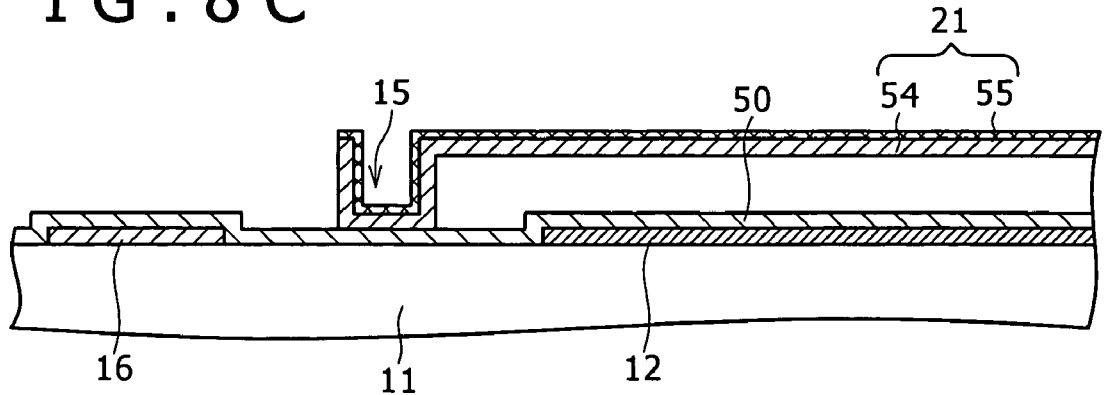
Figure 9:
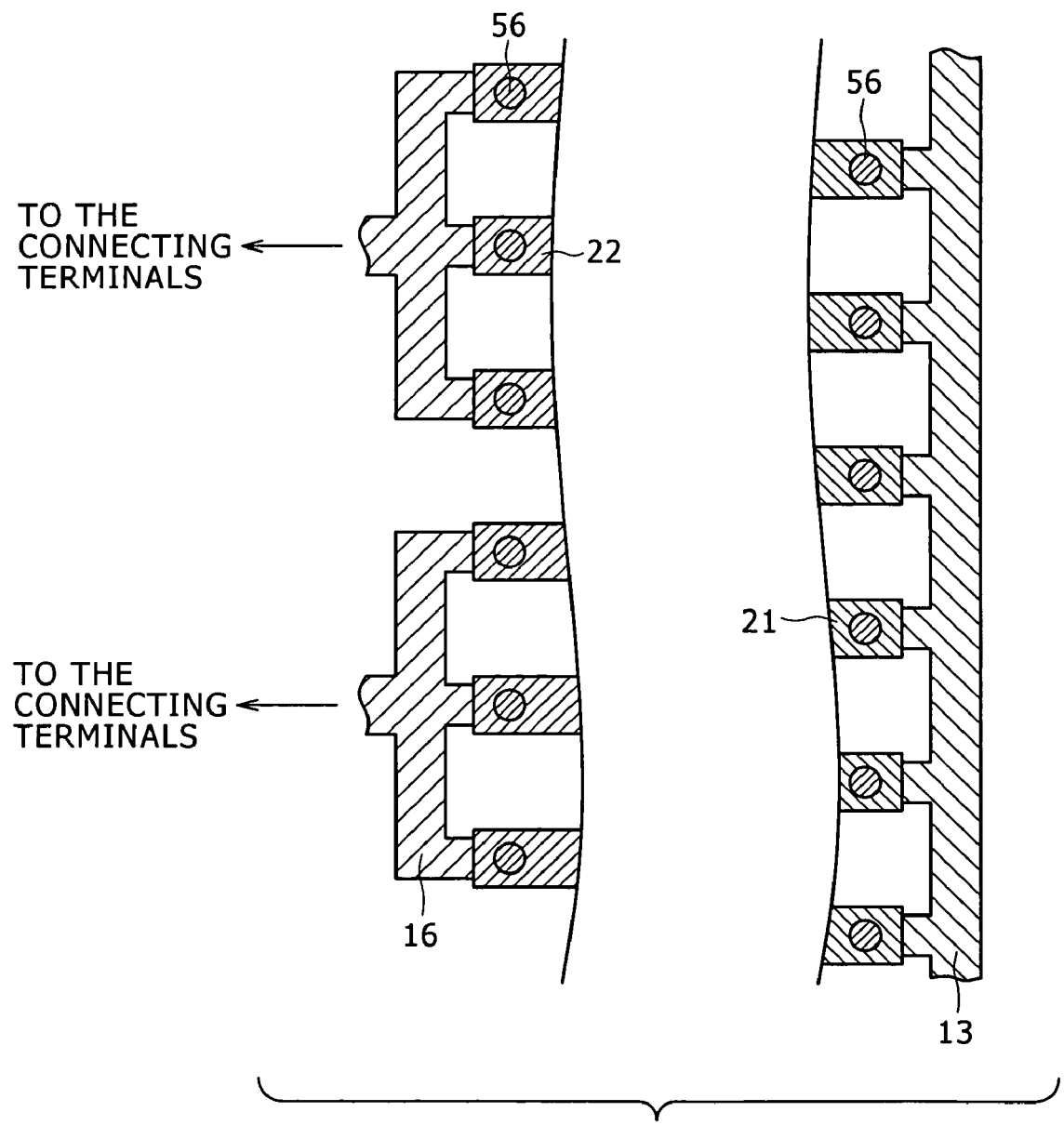
FIG. 9 is a schematic diagram showing the arrangement of the fixed electrodes, movable electrodes, bias electrodes, and control electrodes.
Figure 10A:
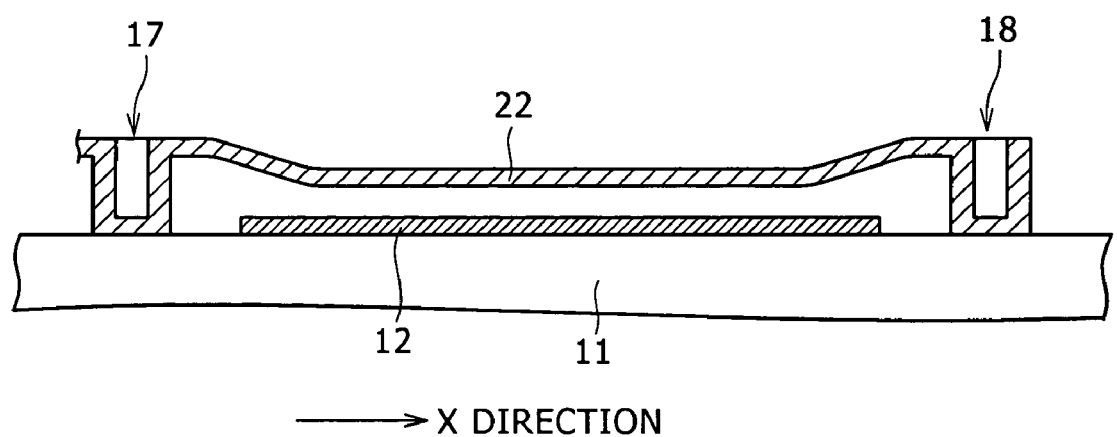
FIG. 10A is a schematic sectional view of the movable electrodes taken along the line A-A in the direction of the arrows in FIG. 6. (The diffraction grating light modulator is in operation.)
Figure 10B:
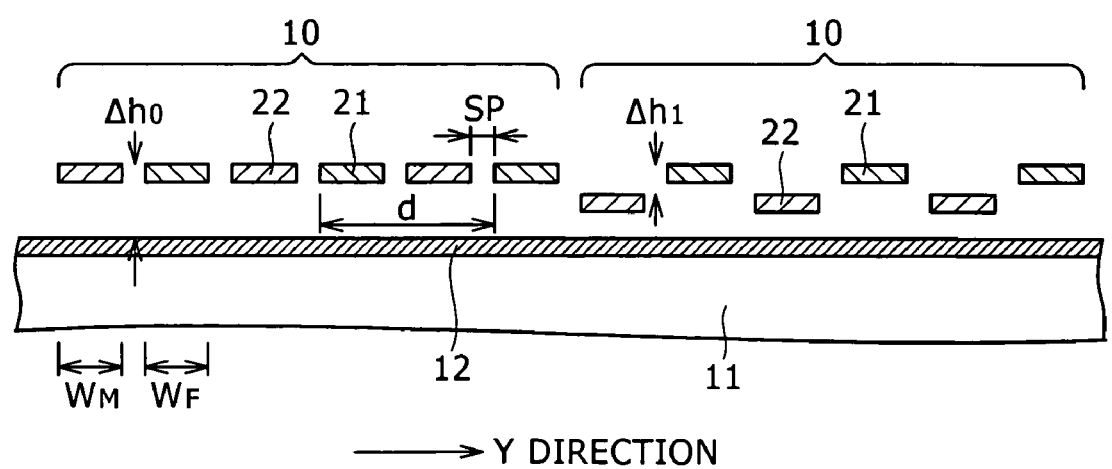
FIG. 10B is a schematic sectional view of the fixed electrodes and movable electrodes taken along the line C-C in the direction of the arrows in FIG. 6.
Figure 12A:
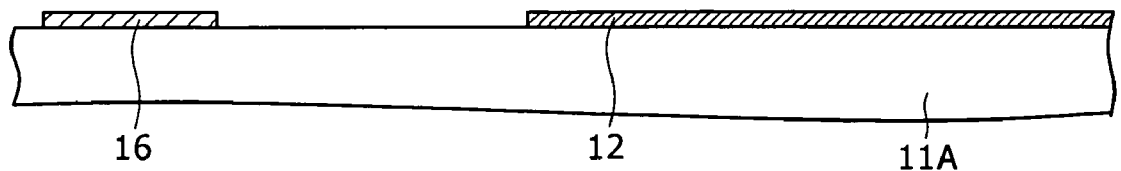
FIGS. 12A to 12D are schematic partial sectional views of the substrate etc. which are intended to outline the process for fabricating the diffraction grating light modulating element, the diffraction grating light modulator, and the aggregate of diffraction grating light modulators.
Figure 12B:
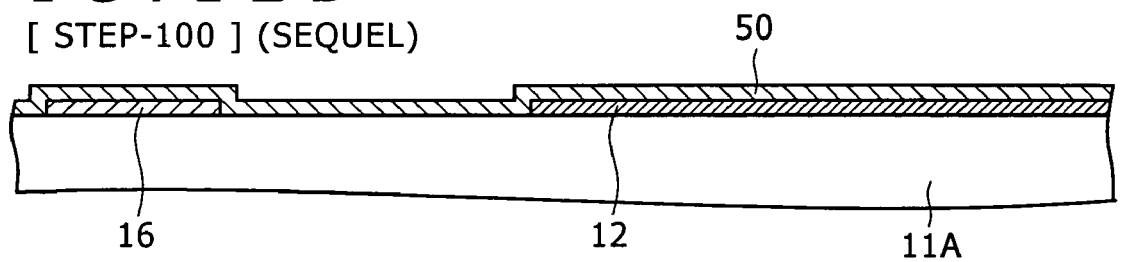
Figure 12C:
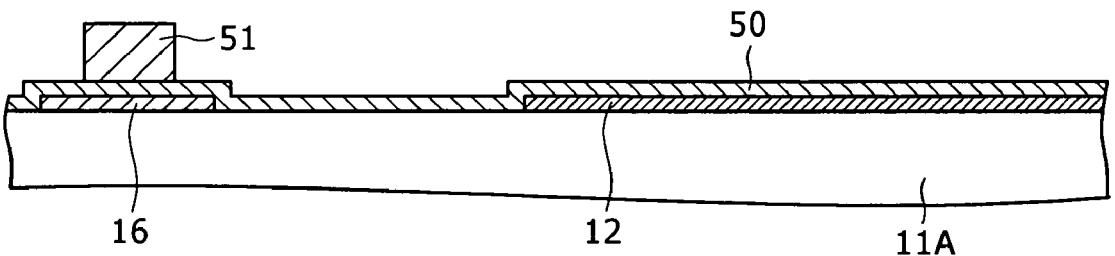
Figure 12D:
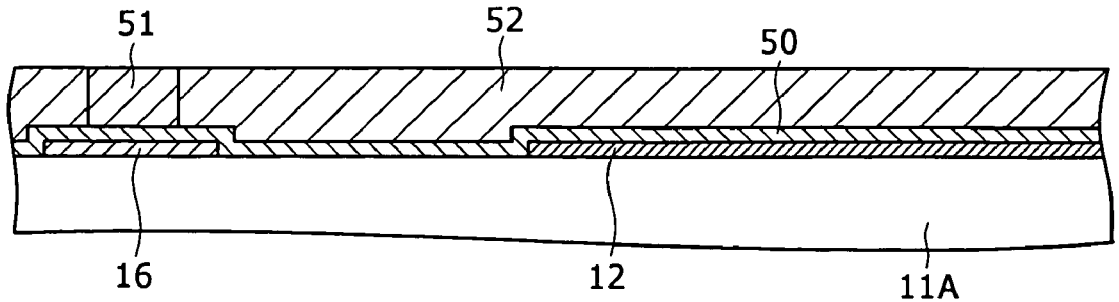

The diffraction grating light modulator 1 is composed of a plurality (say, 1080) of diffraction grating light modulating elements 10. FIG. 6 shows the arrangement of the lower electrode 12, the fixed electrodes 21, and the movable electrodes 22, which constitute the diffraction grating light modulator 10. FIGS. 7A to 7C and FIG. 10A are schematic sectional views showing the movable electrodes 22 taken along the line A-A in the direction of the arrow in FIG. 6. Incidentally, FIG. 7A and the FIG. 10A show the central part of the movable electrode 22, and FIG. 7B and FIG. 7C show respectively the left region and the right region of the movable electrodes 22 shown in FIG. 6. FIGS. 7A to 7C show the diffraction grating light modulator 10 which is not in operation. FIG. 10A shows the diffraction grating light modulator 10 which is in operation. Moreover, FIGS. 8A to 8C are schematic sectional views showing the fixed electrodes 21 taken along the line B-B in the direction of the arrows in FIG. 6. Incidentally, FIG. 8A shows the central part of the fixed electrode 21, and FIG. 8B and FIG. 8C show respectively the left region and the right region of the fixed electrodes 21 shown in FIG. 6. FIG. 9 schematically shows the arrangement of the fixed electrodes 21, the movable electrodes 22, bias electrode 13, and the control electrode 16. Moreover, FIG. 10B is a schematic sectional view of the lower electrodes 12, the fixed electrodes 21, and the movable electrodes 22 taken along the line C-C in the direction of the arrows in FIG. 6. Incidentally, the right side in FIG. 10B shows the diffraction grating light modulator 10 which is in operation, and the left side in FIG. 10B shows the diffraction grating light modulator 10 which is not in operation. In FIGS. 6 and 9, hatching indicates the lower electrodes 12, the fixed electrodes 21, the movable electrodes 22, the bias electrode 13, the control electrode 16, and the supporting parts 14, 15, 17, and 18.

The diffraction grating light modulator 10 consists of the lower electrode 12, the fixed electrodes 21, the movable electrodes 22, the connecting terminals 30, and the protective electrode 40.

The lower electrode 12 is made of polysilicon doped with an impurity, and it is formed on the front face of the support (which is a silicon semiconductor substrate). Incidentally, a protective insulating film 50 of $SiO_2$ is formed on the surface of the lower electrode 12 when the fixed electrodes 21 and the movable electrodes 22 are formed so that the lower electrode 12 is not damaged. Incidentally, the protective insulating film 50 is not shown in FIGS. 6, 7A, 8A, 9, 10A, and 10B. The belt-like (or ribbon-like) fixed electrodes 21 are suspended and stretched above the lower electrode 12. To be concrete, they are supported by the supporting parts 14 and 15, which are the extended parts of the fixed electrode 21. Moreover, the belt-like (or ribbon-like) movable electrodes 22 are suspended and stretched above the lower electrode 12, and they are juxtaposed to the fixed electrodes 21. To be concrete, they are supported by the supporting parts 17 and 18, which are extended parts of the movable electrodes 22. The fixed electrodes 21 and the movable electrodes 22 have a laminate structure thereon, which is composed of a light reflective layer 55 (as an upper layer) of 0.5 wt % Cu-containing aluminum and a dielectric layer 54 (as a lower layer) of SiN. Incidentally, the fixed layers 21 and the movable layers 22 shown in FIGS. 7A 8A, 10A, and 10B are formed as if they are of single layer.

The rectangular connecting terminal 30 is formed from aluminum film on an impurity-doped polysilicon layer. It serves for electrical connection with external circuits (not shown) such as drive circuits. It is exposed and electrically connected to the movable electrodes 22. To be concrete, in Example 1, the diffraction grating light modulator 10 is composed of three fixed electrodes 21 and three movable electrodes 22. The three movable electrodes 22 are collectively connected to the control electrode 16 (of aluminum film) through the connecting hole 56 formed in the connecting part 51. The control electrode 16 is connected to the connecting terminal 30. On the other hand, the three fixed electrodes 21 are collectively connected to the bias electrode 13 (of aluminum film) through the connecting hole 56 formed in the connecting part 51. The bias electrode 13 is common to the diffraction grating light modulators 10. It is connected to the external circuits (such as drive circuits) and grounded through the bias electrode terminal 13A, which is the extended part of the bias electrode 13. The lower electrode 12 is also common to the diffraction light modulators 10. It is connected to the external circuits (such as drive circuits) and grounded through the lower electrode terminal 12A, which is the extended part of the lower electrode 12.

A voltage is applied to the movable electrodes 22 and the lower electrode 12 from the external circuit through the connecting terminals 30. The voltage application generates an electrostatic force (or Coulomb force) between the movable electrodes 22 and the lower electrode 12. This Coulomb force displaces the movable electrodes 22 toward the lower electrode 12. In other words, voltage application to the movable electrodes 22 from the external circuit through the connecting terminal 30 and the control electrode 16 and voltage application to the lower electrode from the external circuit through the lower electrode terminal 12A (in actual, the lower electrode 12 is grounded), generate an electrostatic force (Coulomb force) between the movable electrodes 22 and the lower electrode 12. This electrostatic force displaces the movable electrodes 22 toward the lower electrode 12. Incidentally, FIGS. 7A to 7C and the left side of FIG. 10B show the movable electrodes 22 before displacement, and FIG. 10A and the right side of FIG. 10B show the movable electrodes 22 after displacement. As the result of displacement mentioned above, the movable electrodes 22 and the fixed electrodes 21 constitute a reflective diffraction grating.

FIG. 5 schematically shows the aggregate of diffraction grating light modulators in Example 1. A plurality of diffraction grating light modulators 1 mentioned above are formed on the front face of the substrate 11A (which is a silicon semiconductor substrate). Incidentally, dotted lines in FIG. 5 denote dicing lines. Here, the aggregate of diffraction grating light modulators is a collection of diffraction grating light modulators 1 arranged in a two-dimensional matrix as shown in FIG. 5. After cutting and separation, it is possible to obtain individual diffraction grating light modulator 1. Incidentally, the diffraction grating light modulator 1 is composed of a plurality of diffraction grating light modulating elements 10 formed on the surface of the support 11. In one diffraction grating light modulator 1, there are a plurality of diffraction grating light modulating elements 10 which are arranged in one-dimensional array. To be concrete, the fixed electrodes 21 and movable electrodes 22, which constitute a plurality (say, 1080) of diffraction grating light modulating elements 10, are juxtaposed to each other in the direction (Y axis) perpendicular to the axial direction (X axis) of the fixed electrodes 21 and the movable electrodes 22. The total number of the fixed electrodes 21 and the movable electrodes 22 is 1080×6. Also, the number of the connecting terminals 30 is 1080. Here, the term "diffraction grating light modulator proper 2" is used to denote the aggregate of a plurality of diffraction grating light modulating elements constituting one diffraction grating light modulator 1.

The diffraction grating light modulator proper 2 is surrounded by a sealing member (not shown), and the glass plate 3 is fixed to the top of the sealing member. Outside the sealing member are provided the connecting terminal 30, the protective electrode 40, the lower electrode terminal 12A, and the bias electrode terminal 13A. The diffraction grating light modulating proper 2, which is surrounded by the sealing member and the glass plate, is kept air-tight. The control electrode 16 extends through the space between the sealing member and the support 11 (or the substrate 11A). One control electrode 16 is separated from its adjacent control electrode 16 by an insulator so that they do not short-circuit.

The above-mentioned structure for the diffraction grating light modulator 1, the aggregate of diffraction grating light modulators, the electronic device chip, and the aggregate of electronic device chips is applicable also to the diffraction grating light modulator, the aggregate of diffraction grating light modulators, the electronic device chip, and the aggregate of electronic device chips according to Examples 2 and 4 (mentioned later) except for the structure of the protective electrode. The above-mentioned operating principle for the diffraction grating light modulator 1 (and the diffraction grating light modulating element 10) is also applicable to the diffraction grating light modulator (and the diffraction grating light modulating element) according to Examples 2 to 4 (mentioned later).

The diffraction grating light modulator 1 according to Example 1 is provided with the protective electrode 40 which surrounds the connecting terminal 30. Incidentally, the protective electrode 40 prevents static electricity, which might occur on the front face and/or the rear face of the substrate 11A or the support 11, from entering the movable electrodes 22 from the connecting terminal 30. Such static electricity occurs during transportation of the diffraction grating light modulator or the aggregate of diffraction grating light modulators. Static electricity is also liable to occur when a dicing tape is peeled off. (A dicing tape (or film) is attached to the rear face of the substrate 11A when the aggregate of diffraction grating light modulators is cut and separated, and it is removed after cutting.)

In Example 1, the protective electrode 40 is in a floating state. In other words, the protective electrode 40 is not electrically connected to any part constituting the diffraction grating light modulator (or the electronic device chip). The protective electrode 40 is formed from the same material as used for the connecting terminal 30.

In Example 1, the protective electrode 40 has a plane shape such that the protective electrode 40 surrounds the connecting terminal 30, with a certain distance left between them. To be concrete, one protective electrode 40 is provided for one connecting terminal 30, and the protective electrode 40 is electrically connected to the other protective electrode 40. Incidentally, the protective electrode 40 surrounds the connecting terminal 30 over the almost entire periphery of the connecting terminal 30 excluding the connecting part for the connecting terminal 30 and the control electrode 16.

In Example 1, the electronic device chip has the connecting terminal 30, which is formed on the surface of the support 11 for electrical connection with external circuits (not shown) and is exposed. It also has the protective electrode 40 that surrounds the connecting terminal 30. The aggregate of electronic device chips according to Example 1 is an aggregate composed of such electronic device chips. The aggregate of electronic device chips has a plurality of electronic device chips arranged in a two-dimensional matrix. The aggregate of electronic device chips is cut and separated into individual electronic device chips.

In Example 1, the difference $\Delta h_0$ between the height of the top of the lower electrode 12 and the height of the top of the fixed electrodes 21 has a value shown in Table 1. The difference between the height of the top of the movable electrodes 22 and the height of the top of the fixed electrodes 21 is kept as close to zero as possible when the diffraction grating light modulating element is not in operation. Moreover, the maximum value ($\Delta h_{1-MAX}$) of the difference ($\Delta h_1$) which is the amount of downward displacement of the movable electrodes 22) between the height of the top of the movable electrodes 22 and the height of the top of the fixed electrodes 21 satisfies the following expression when the diffraction grating light modulating element 10 is in operation.

$$\Delta h_{1-MAX} = \lambda/4$$

where, $\lambda$ is the wavelength of light incident to the diffraction grating light modulating element 10 or the diffraction grating light modulator 1. Also, the relation between $\Delta h_{1-MAX}$ and $\Delta h_1$ satisfies the following expression.

$$\Delta h_{1-MAX} \leq \Delta h_0/3$$

By varying the voltage applied to the movable electrodes 22, it is possible to change the difference $\Delta h_1$ (which is the amount of downward displacement of the movable electrodes 22) between the height of the top of the movable electrodes 22 and the height of the top of the fixed electrodes 21. In this way, it is possible to change the intensity of diffracted light and to control the gray level.

Table 1 below specifies the distance (d) between adjacent fixed electrodes 21, the gap (SP) between adjacent fixed electrode and movable electrode, the width $W_F$ of the fixed electrode 21, the effective length $L_F$ of the fixed electrode 21, the width $W_M$ of the movable electrode 22, and the effective length $L_M$ of the movable electrode 22. All units are in μm.

TABLE 1

| | |
|---|---|
| $\Delta h_0$ | 0.85 |
| d | 8.0 |
| SP | 0.40 |
| $W_F$ | 3.6 |
| $L_F$ | 200 |
| $W_M$ | 3.6 |
| $L_M$ | 200 |

The image-forming equipment shown in FIG. 11 may be constructed from three units of the diffraction grating light modulator 1 in Example 1 or three units of the diffraction grating light modulator in Examples 2 to 4 (mentioned later). The image-forming equipment provided with three units of the diffraction grating light modulator works in the same way as explained above with reference to FIG. 11. Therefore, no detailed description is given here.

Figure 1B:
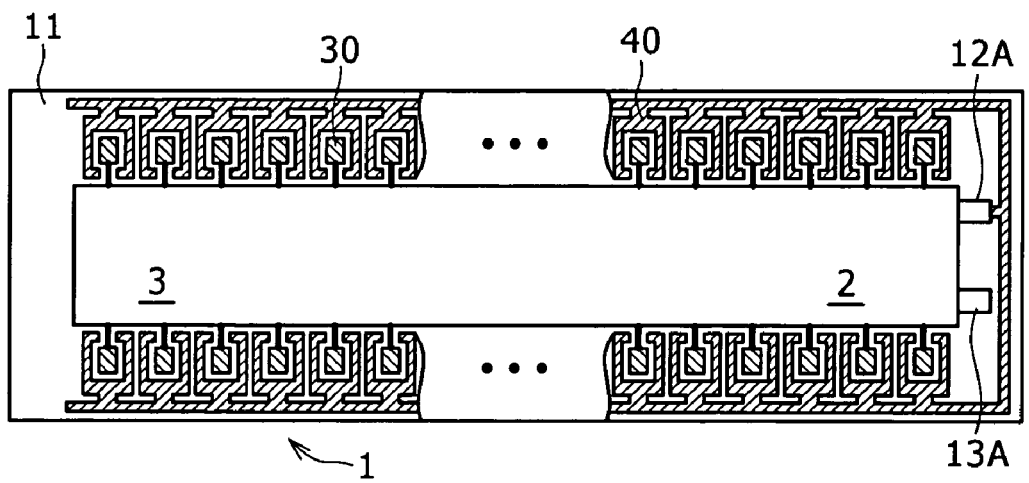
Figure 1C:
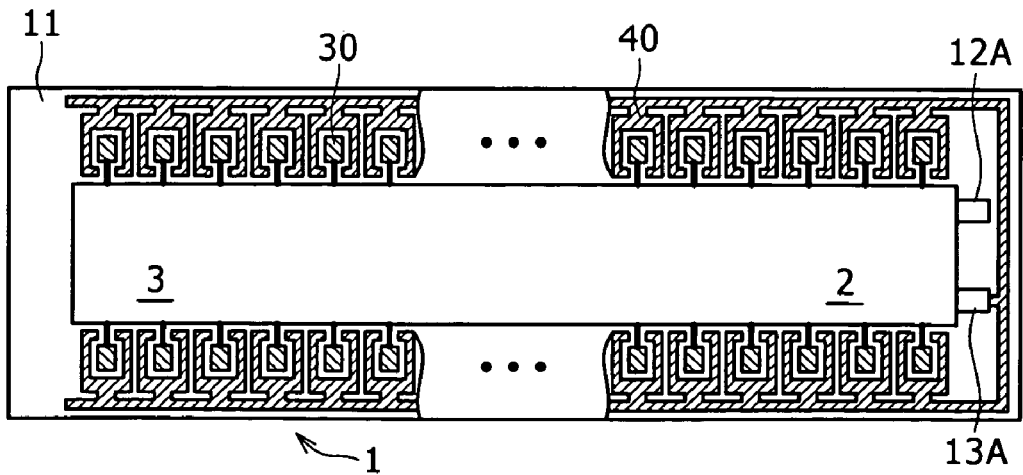

FIGS. 1B and 1C show the modified versions of the diffraction grating light modulator in Example 1.

As shown in FIG. 1B, the modified version of the diffraction grating light modulator in Example 1 is characterized in that the protective electrode 40 is not in floating state but is connected to the lower electrode 12 through the lower electrode terminal 12A. By contrast, as shown in FIG. 1C, the modified version of the diffraction grating light modulator in Example 1 is characterized in that the protective electrode 40 is connected to the bias electrode 13 through the bias electrode terminal 13A. Except for these points, the modified diffraction grating light modulator and the aggregate of modified diffraction grating light modulators are constructed in the same way as those in Example 1. Therefore, no detailed description is given here.

The process for fabricating the diffraction grating light modulating element, the diffraction grating light modulator, and the aggregate of diffraction grating light modulators is outlined below with reference to FIGS. 12A to 12D and FIGS. 13A to 13D, which are schematic partial sectional views of the substrate 11A as viewed in the direction of X axis.

[Step 100]

First, the lower electrodes 12 and the lower electrode terminals 12A are formed by CVD and etching in a desired region on the surface of the substrate 11A. Then, the bias electrodes 13, the bias electrode terminal 13A, the control electrode 16, the connecting terminal 30, and the protective terminal 40 are formed by lift off method or etching method on the surface of the substrate. Incidentally, FIGS. 12A to 12D and FIGS. 13A to 13D show only the lower electrode 12 and the control electrode 16. Thus there is obtained the structure shown in FIG. 12A. Then sputtering is performed on the entire surface to form the protective insulating film 50. See FIG. 12B.

[Step 110]

The cylindrical connecting part 51 of SiN is formed by CVD and etching at the part for electrical connection of the movable electrodes 22 and the control electrode 16 and at the part for electrical connection of the fixed electrode 21 and the bias electrode 13. Thus there is obtained the structure shown in FIG. 12C. Incidentally, FIG. 12C does not show the connecting part for electrical connection of the fixed electrodes 21 and the bias electrode 13.

[Step 120]

The sacrificial layer 52 of polysilicon is formed by CVD over the entire surface. The top of the sacrificial layer 52 is smoothened by chemical-mechanical polishing. Thus there is obtained the structure shown in FIG. 12D.

[Step 130]

Figure 13A:
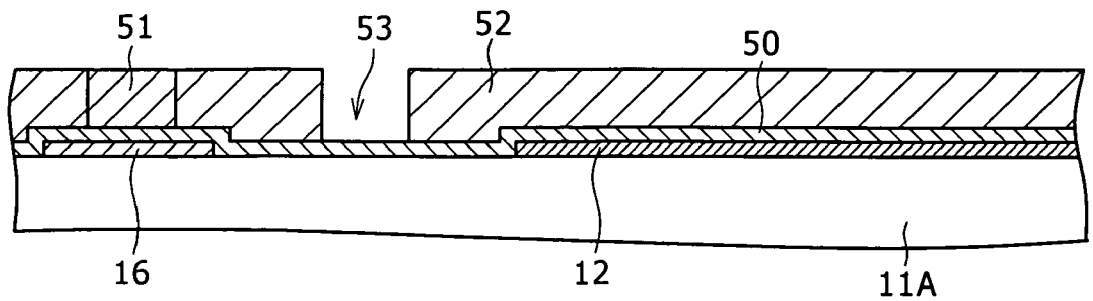
FIGS. 13A to 13D are schematic partial sectional views of the substrate etc. which are intended to outline the process (that follows the step shown in FIG. 12D) for fabricating the diffraction grating light modulating element, the diffraction grating light modulator, and the aggregate of diffraction grating light modulators.
Figure 13B:
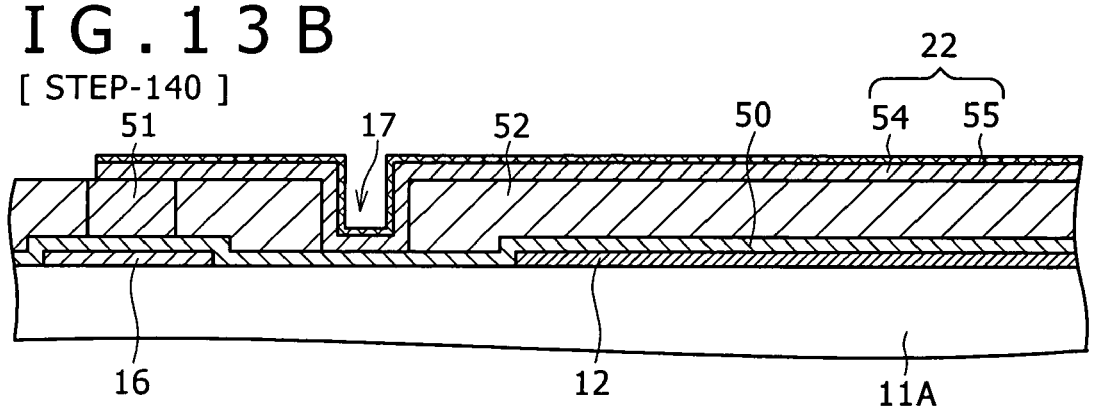
Figure 13C:
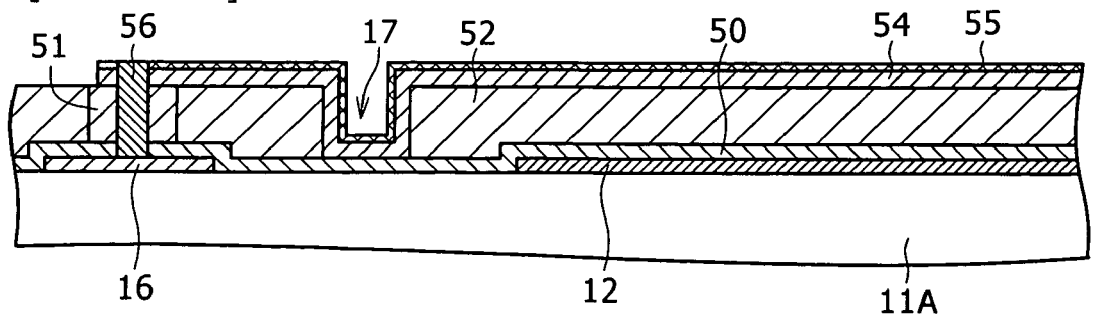
Figure 13D:
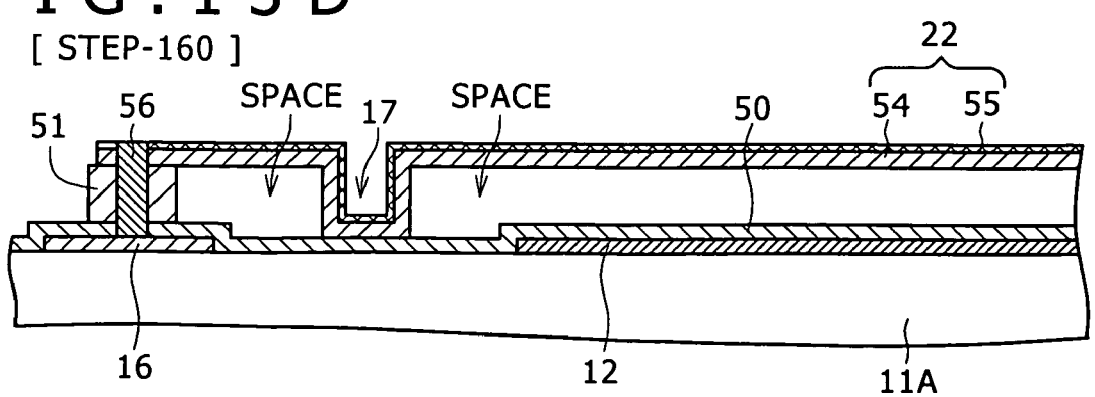

The opening 53 for the supports 14, 15, 17, and 18 is formed by lithography and dry etching in the sacrificial layer 52. See FIG. 13A. FIG. 13A shows only the opening 53 in which the support 17 is formed.

[Step 140]

The fixed electrodes 21 and the movable electrodes 22 are formed, which are of dual layer structure consisting of the reflective layer (upper layer) and the dielectric layer (lower layer). To be concrete, sputtering is performed over the entire surface including the opening 53 to form the dielectric layer (lower layer) 54 of SiN. Sputtering is further performed to form the reflective layer (upper layer) 55 of Al—Cu on the dielectric layer 54. Patterning is performed on the reflective layer (upper layer) 55 and the dielectric layer (lower layer) 54 constituting the dual layer structure. Thus there are obtained the belt-like (ribbon-like) fixed electrodes 21 and the belt-like (ribbon-like) movable electrodes 22. In this way it is possible to obtain the structure shown in FIG. 13B. The supports 14, 15, 17, and 18 are formed from the reflective layer (upper layer) 55 and the dielectric layer (lower layer) 54 constituting the dual layer structure which are embedded in the opening 53. Incidentally, the fixed electrodes 21 and the supports 14, 15, and 18 are not shown.

[Step 150]

Lithography and dry etching are performed to form the opening for the connecting part 51 and the protective insulating film 50, so that the control electrode 16 and the bias electrode 13 are exposed at the bottom of the opening. The opening is filled with a conductive material, and the connecting hole for electrical connection of the movable electrodes 22 and the control electrode 16 is formed and the connecting hole for electrical connection of the fixed electrodes 21 and the bias electrode 13 is formed. See FIG. 13C. Incidentally, FIG. 13C does not show the connecting hole for electrical connection of the fixed electrodes 21 and the bias electrode 13.

[Step 160]

The protective insulating film 50 on both the connecting terminal 30 and the protective electrode 40 is removed, and then the sacrificial layer 52 is removed. In this way there are obtained the fixed electrodes 21 and the movable electrodes 22. The fixed electrodes 21 are supported by the supports 14 and 15 and suspended and stretched above the lower electrode 12, and the movable electrodes 22 are supported by the supports 17 and 18 and suspended and stretched above the lower electrode 12. Incidentally, FIG. 13D only shows the movable electrode 22 which is supported by the support 17 and suspended and stretched above the lower electrode 12. In this way it is possible to obtain the aggregate of diffraction grating light modulators which is formed on the surface of the substrate 11A, each of the diffraction grating light modulator consisting of a plurality of diffraction grating light modulating elements 10.

[Step 170]

The sealing member is provided such that it surrounds the diffraction grating light modulator proper 2 in each diffraction grating light modulator. The glass plate 3 is fixed to the top of the sealing member. A dicing tape is pasted to the rear face of the substrate 11A, and dicing is carried out in the usual way, thereby cutting and separating the aggregate of diffraction grating light modulators. After that, the dicing tape is peeled off. Thus there is obtained the diffraction grating light modulator in which a plurality of diffraction grating light modulating elements 10 are formed on the front face of the support 11.

EXAMPLE 2

Figure 2A:
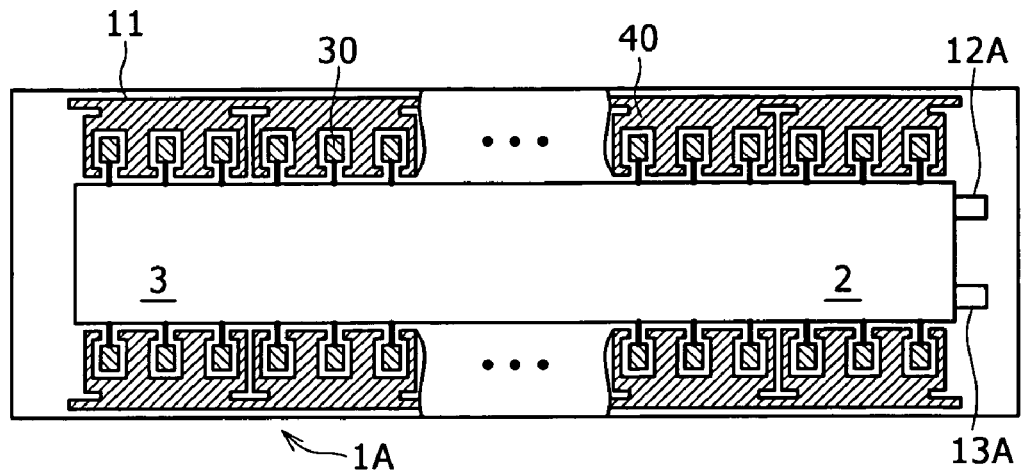
FIGS. 2A to 2C are schematic diagrams showing the diffraction grating light modulator and modified versions thereof in Example 2.

Example 2 is a modification of Example 1. In Example 2, the diffraction grating light modulator 1 in Example 1 is modified such that one protective electrode 40 is provided for one connecting terminal 30, and these protective electrodes 40 are electrically connected to each other. On the other hand, in Example 2, one protective electrode 40 is provided for more than one connecting terminal 30 (three in the illustrated example although the number is not specified), as shown in FIG. 2A, and these protective electrodes 40 are electrically connected to each other. The protective electrode 40 is in a floating state.

Figure 2B:
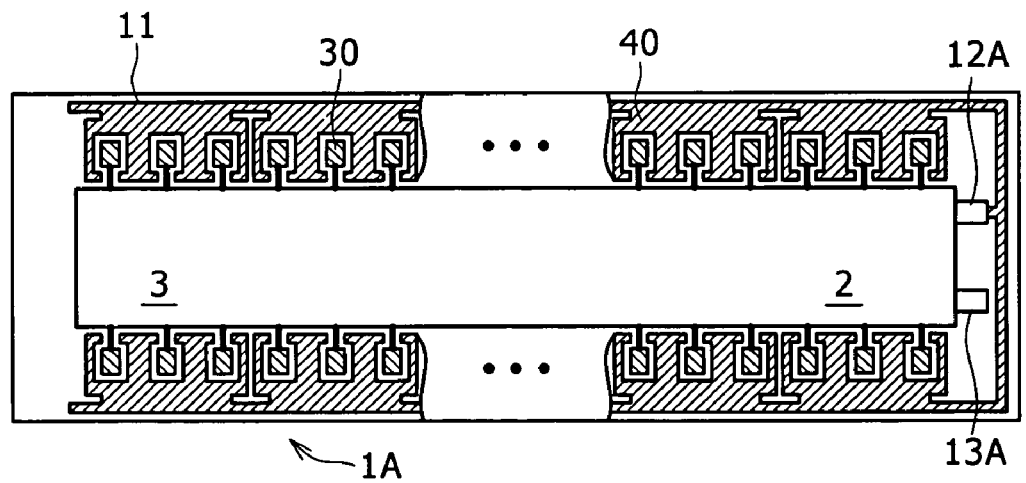
Figure 2C:
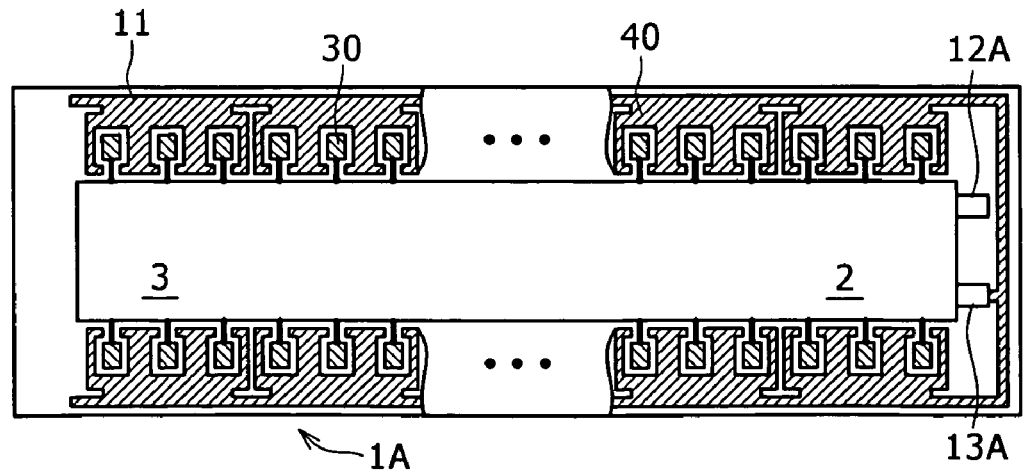

FIGS. 2B and 2C show a modification of the diffraction grating light modulator 1A in Example 2. In the modification shown in FIG. 2B, the protective electrode 40 is connected to the lower electrode 12 through the lower electrode terminal 12A. On the other hand, in the modification shown in FIG. 2C, the protective electrode 40 is connected to the bias electrode 13 through the bias electrode terminal 13A.

Except for these points, there is no difference in structure between products in Example 1 and Example 2. (The product includes the diffraction grating light modulator 1A and its modification and the aggregate of diffraction grating light modulators based on the diffraction grating light modulator 1A and its modification.) Therefore, detailed description is omitted.

EXAMPLE 3

Figure 3A:
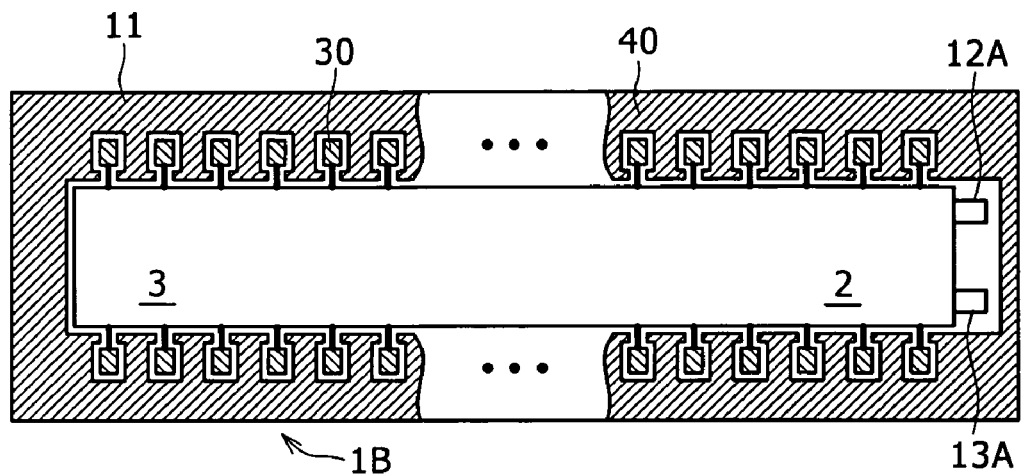
FIGS. 3A to 3C are schematic diagrams showing the diffraction grating light modulator and modified versions thereof in Example 3.

Example 3 is a modification of Example 1. The diffraction grating light modulator 1B in Example 3 is modified such that one protective electrode 40 is provided for all the connecting terminals 30, as shown in FIG. 3A. The protective electrode 40 is in a floating state.

Figure 3B:
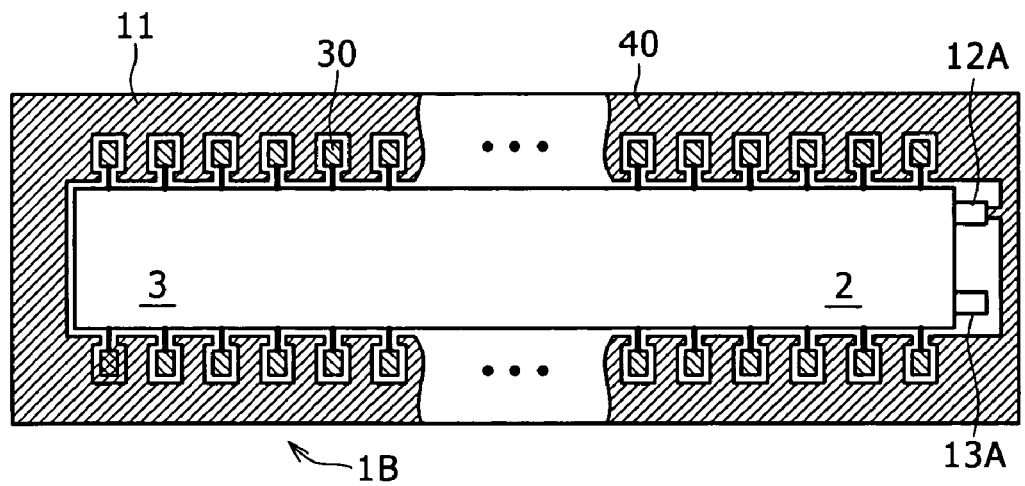
Figure 3C:
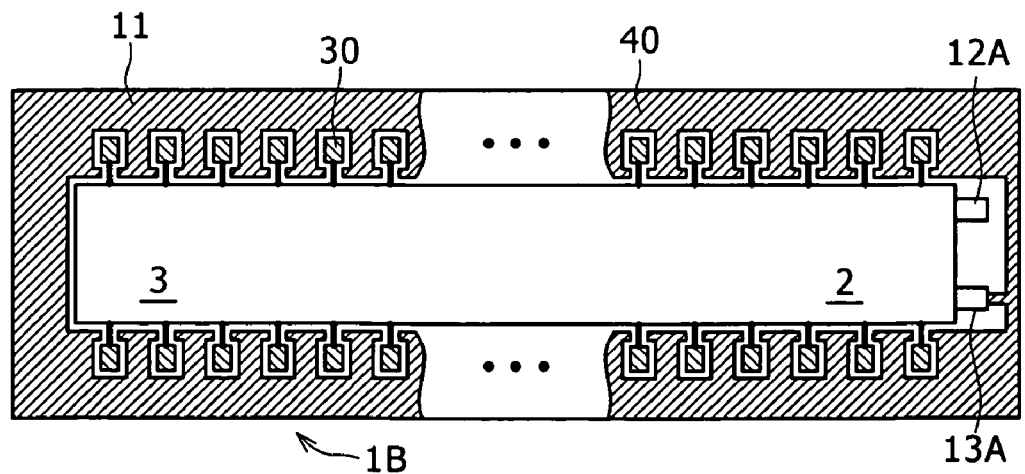

FIGS. 3B and 3C show a modification of the diffraction grating light modulator 1B in Example 3. In the modification shown in FIG. 3B, the protective electrode 40 is connected to the lower electrode 12 through the lower electrode terminal 12A. On the other hand, in the modification shown in FIG. 3C, the protective electrode 40 is connected to the bias electrode 13 through the bias electrode terminal 13A.

Except for these points, there is no difference in structure between products in Example 1 and Example 3. (The product includes the diffraction grating light modulator 1B and its modification and the aggregate of diffraction grating light modulators based on the diffraction grating light modulator 1B and its modification.) Therefore, detailed description is omitted.

EXAMPLE 4

This example is concerned with the aggregate of electronic device chips pertaining to the present invention, the electronic device chip pertaining to the present invention, the aggregate of diffraction grating light modulators pertaining to the second embodiment of the present invention, and the diffraction grating light modulator pertaining to the second embodiment of the present invention.

Figure 4A:
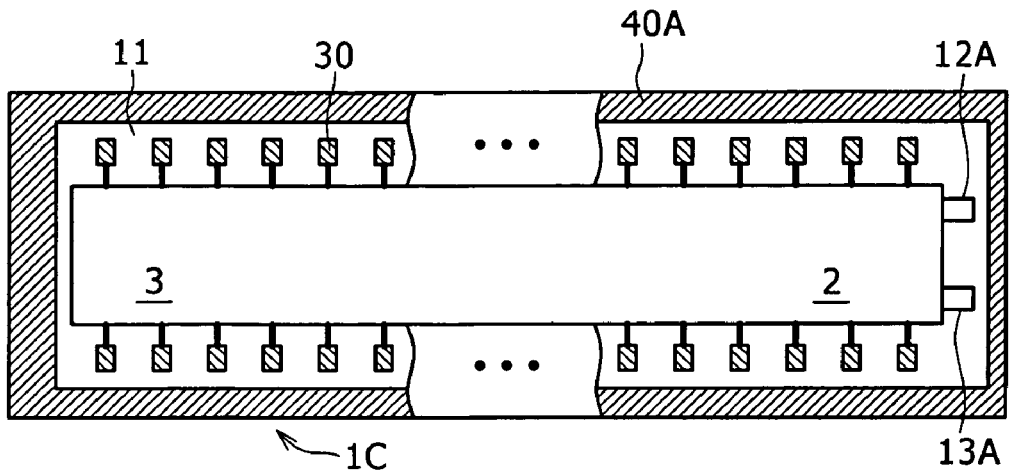
FIGS. 4A to 4C are schematic diagrams showing the diffraction grating light modulator and modified versions thereof in Example 4.

In the diffraction grating light modulator 1C of Example 4, the protective electrode 40A is formed around the support 11, as shown in FIG. 4A. Also, in the aggregate of diffraction grating light modulators, the protective electrode 40A is formed around each of the diffraction grating light modulator 1C.

In the electronic device chip or the aggregate of electronic device chips, the protective electrode surrounding the connecting terminal is provided. To be concrete, in Example 4, the protective electrode 40A is formed around the electronic device chip.

Incidentally, the protective electrode 40A is provided to prevent static electricity, which might occur on the front face and/or the rear face of the substrate 11A or the support 11 from entering the movable electrodes 22 through the connecting terminal 30.

In the diffraction grating light modulator 1C (or the electronic device chip) of Example 4, the protective electrode 40A is in a floating state. In other words, the protective electrode 40A is not electrically connected to any part constituting the diffraction grating light modulator (or the electronic device chip).

In the aggregate of diffraction grating light modulators of Example 4, or in the diffraction grating light modulator 1C of Example 4, the protective electrode 40A may take on a plane shape such that the protective electrode 40A singly surrounds the diffraction grating light modulator proper 2 over the entire periphery, with a certain space left between them.

Figure 4B:
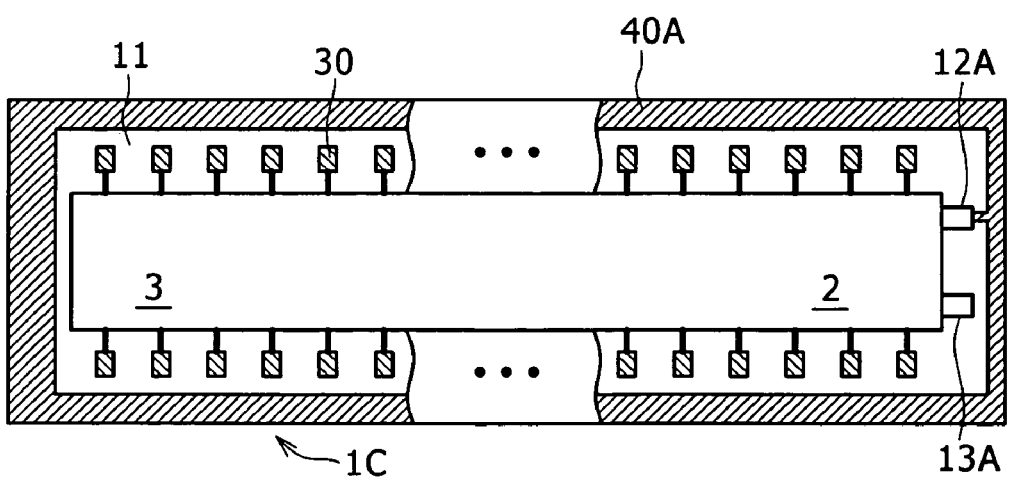
Figure 4C:
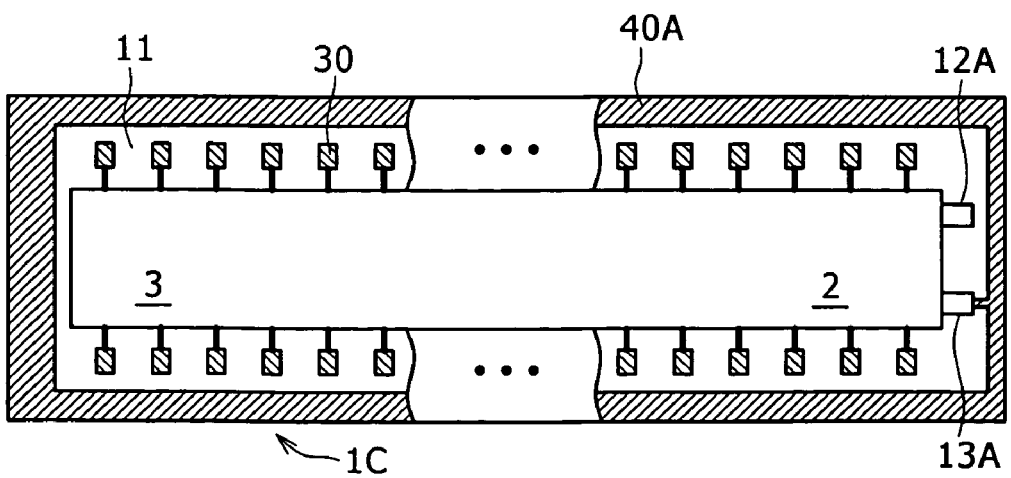

FIGS. 4B and 4C show a modification of the diffraction grating light modulator 1C in Example 4. In the modification shown in FIG. 4B, the protective electrode 40A is connected to the lower electrode 12 through the lower electrode terminal 12A. On the other hand, in the modification shown in FIG. 4C, the protective electrode 40A is connected to the bias electrode 13 through the bias electrode terminal 13A.

Except for these points, there is no difference in structure between products in Example 1 and Example 4. (The product includes the diffraction grating light modulator 1C and its modification, the aggregate of diffraction grating light modulators based on the diffraction grating light modulator 1C and its modification, and the electronic device chip and the aggregate of electronic device chips.) Therefore, detailed description is omitted.

Although the invention has been described in its preferred from, which is not intended to restrict the scope thereof. The diffraction grating light modulator, the aggregate of diffraction grating light modulators, the electronic device chip, and the aggregate of electronic device chips, which were described above in Examples, are mere illustrations, and the materials and dimensions for the parts constituting the diffraction grating light modulator and the diffraction grating light modulating elements are also mere illustrations. They may be changed adequately. For example, it is possible to adopt a protective electrode which has both the characteristic features of in the first and second embodiments.

In Examples mentioned above, a plurality of connecting terminals 30 are arranged in a single line along two opposing sides of the diffraction grating light modulation proper 2. This arrangement is a mere illustration; they may be arranged zigzag in two or more rows.

In Examples 1 to 3, the protective electrode 40 takes on a shape which surrounds the connecting terminals 30, with a certain distance kept away from them. In addition, the protective electrode 40 surrounds almost entirely the connecting terminals 30 excluding those parts for connection to the connecting terminal 30 and the control electrode 16. This configuration may be changed such that the protective electrode 40 partly surrounds the connecting terminals 30.

In Example 4, modification may be made such that the protective electrode 40A surrounds part (say, one half) of the periphery of the diffraction grating light modulator proper 2. Another modification may be made such that the protective electrode 40A surrounds in double or more instead of the protective electrode 40A surrounding in a single row the diffraction grating light modulator proper 2, with a certain distance kept away from it, provided that they are electrically connected to each other.

In Examples 1 to 4, modification may be made such that the protective electrode 40 or 40A is connected indirectly (instead of directly) to the lower electrode 12 (more specifically the lower electrode 12A) through a resistor. Also, modification may be made such that the protective electrode 40 or 40A is connected indirectly (instead of directly) to the bias electrode 13 (more specifically the bias electrode 13A) through a resistor.

In Examples 1 to 4, the top of the movable electrodes 22 and the top of the fixed electrodes 21 are parallel to the top of the lower electrode 12. However, this may be changed such that they are inclined by a blaze angle of $\theta_D$. This modification yields a blazed grating which produces only the diffracted light of the first order (m=+1).

While a preferred embodiment of the invention has been described using specific terms, such description is for illustrative purposes only, and it is to be understood that changes and variations may be made without departing from the spirit or scope of the following claims.

What is claimed is:

1. An aggregate of electronic device chips on a substrate surface, each electronic device chip comprising:
   a first electrode;
   a second electrode;
   a third electrode; and
   an exposed connecting terminal,
      wherein
         the first electrode of each electronic device chip is connected to a common terminal,
         the second electrode of each electronic device chip is connected to a second common terminal,
         the third electrode is electrically isolated from the second electrode and connected to the exposed connecting terminal,
         each said exposed connecting terminal is adapted for electrical connection to an external circuit for application of a voltage between the third electrode and the first electrode, and
         each said exposed connecting terminal is substantially surrounded by a protective electrode electrically isolated from said exposed connecting terminal.

2. The aggregate of electronic device chips as defined in claim 1, wherein the protective electrode prevents static electricity occurring on at least one face of the substrate from entering the electronic device chip through the connecting terminal.

3. The aggregate of electronic device chips as defined in claim 1, wherein each protective electrode is electrically isolated from each of a respective first electrode and a respective second electrode.

4. An electronic device chip on a substrate surface comprising:
   a first electrode;
   a second electrode,
   a third electrode; and
   an exposed connecting terminal,
      wherein
         the first electrode is connected to a first terminal,
         the second electrode is connected to a second terminal,
         the third electrode is electrically isolated from the second electrode and connected to the exposed connecting terminal,
         the exposed connecting terminal is adapted for electrical connection to an external circuit for application of a voltage between the third electrode and the first electrode, and
         said exposed connecting terminal is substantially surrounded by a protective electrode electrically isolated from the exposed connecting terminal.

5. The electronic device chip as defined in claim 4, wherein the protective electrode prevents static electricity occurring on at least one face of the substrate from entering the electronic device chip through the connecting terminal.

6. The electronic device chip as defined in claim 4, wherein the protective electrode is electrically isolated from each of the first electrode and the second electrode.

7. The aggregate of electronic device chips as defined in claim 1, wherein
   the protective electrode is electrically connected to one of the first electrode and the second electrode.

8. The aggregate of electronic device chips as defined in claim 4, wherein
   the protective electrode is electrically connected one of the first electrode and the second electrode.

* * * * *